[12] United States Patent
Bülter

(10) Patent No.: US 11,139,123 B2
(45) Date of Patent: Oct. 5, 2021

(54) RESIDUAL LOAD CIRCUIT BREAKER

(71) Applicant: WALTER KRAUS GMBH, Augsburg (DE)

(72) Inventor: Olaf Bülter, Sulzbach (DE)

(73) Assignee: WALTER KRAUS GMBH, Augsburg (DE)

(*) Notice: Subject to any disclaimer, the term of this patent is extended or adjusted under 35 U.S.C. 154(b) by 0 days.

(21) Appl. No.: 16/635,268

(22) PCT Filed: Aug. 1, 2018

(86) PCT No.: PCT/EP2018/070880
§ 371 (c)(1),
(2) Date: Jan. 30, 2020

(87) PCT Pub. No.: WO2019/025493
PCT Pub. Date: Feb. 7, 2019

(65) Prior Publication Data
US 2020/0373096 A1 Nov. 26, 2020

(30) Foreign Application Priority Data
Aug. 1, 2017 (DE) ...................... 20 2017 104 597.8

(51) Int. Cl.
*H01H 1/14* (2006.01)
*H01H 3/26* (2006.01)
(Continued)

(52) U.S. Cl.
CPC ................ *H01H 1/14* (2013.01); *H01H 3/26* (2013.01); *H01H 3/32* (2013.01); *H01H 9/02* (2013.01)

(58) Field of Classification Search
CPC .. H01H 1/14; H01H 3/26; H01H 3/32; H01H 9/02
(Continued)

(56) References Cited

U.S. PATENT DOCUMENTS 3,626,126 A    12/1971  Pesch
2003/0123209 A1*  7/2003  Kim ...................... H01H 83/20
                                                        361/144

(Continued)

FOREIGN PATENT DOCUMENTS

CH    514226 A    10/1971
DE    1203343 A   10/1965
(Continued)

*Primary Examiner* — Edwin A. Leon
*Assistant Examiner* — Iman Malakooti
(74) *Attorney, Agent, or Firm* — McGlew and Tuttle, P.C.

(57) ABSTRACT

A residual load disconnector switch (1) includes a rotary switch body (23), which includes a contact blade (24, 25, 26, 27), that is rotatable about an axis (A) and is arranged between a feed line connection (20) and a discharge line connection (21), and includes end-side contact surfaces (28, 29, 30, 31) protruding in a radial direction. The contact surfaces, in a closed rotary position (S1) of the rotary switch body (23), are in touching contact with the feed line connection (20) and with the discharge line connection (21). In an open rotary position (S2) of the rotary switch body (23), the contact surfaces are each spaced with respect to the feed line connection (20) and with the discharge line connection (21). The residual load disconnector switch (1) is rotationally limited in one rotational direction for performing switching movements and can be actuated unidirectionally and cyclically.

23 Claims, 9 Drawing Sheets

(51) Int. Cl.
*H01H 3/32* (2006.01)
*H01H 9/02* (2006.01)

(58) Field of Classification Search
USPC .......................................................... 200/273
See application file for complete search history.

(56) References Cited

U.S. PATENT DOCUMENTS

| | | | |
|---|---|---|---|
| 2008/0088395 A1* | 4/2008 | Seo ........................ | H01H 1/226 335/15 |
| 2013/0153538 A1 | 6/2013 | Park | |
| 2016/0099120 A1 | 4/2016 | Välivainio et al. | |

FOREIGN PATENT DOCUMENTS

| | | | | |
|---|---|---|---|---|
| DE | 3428519 | * | 2/1986 | ............. H01H 19/28 |
| DE | 3428519 A1 | | 2/1986 | |
| EP | 2050111 B1 | | 5/2012 | |
| EP | 2718949 A1 | | 4/2014 | |
| EP | 2936525 B1 | | 1/2017 | |
| WO | 2008/015009 A1 | | 2/2008 | |
| WO | 2012168553 A1 | | 12/2012 | |
| WO | 2013153279 A1 | | 10/2013 | |
| WO | 2013186433 A1 | | 12/2013 | |

* cited by examiner

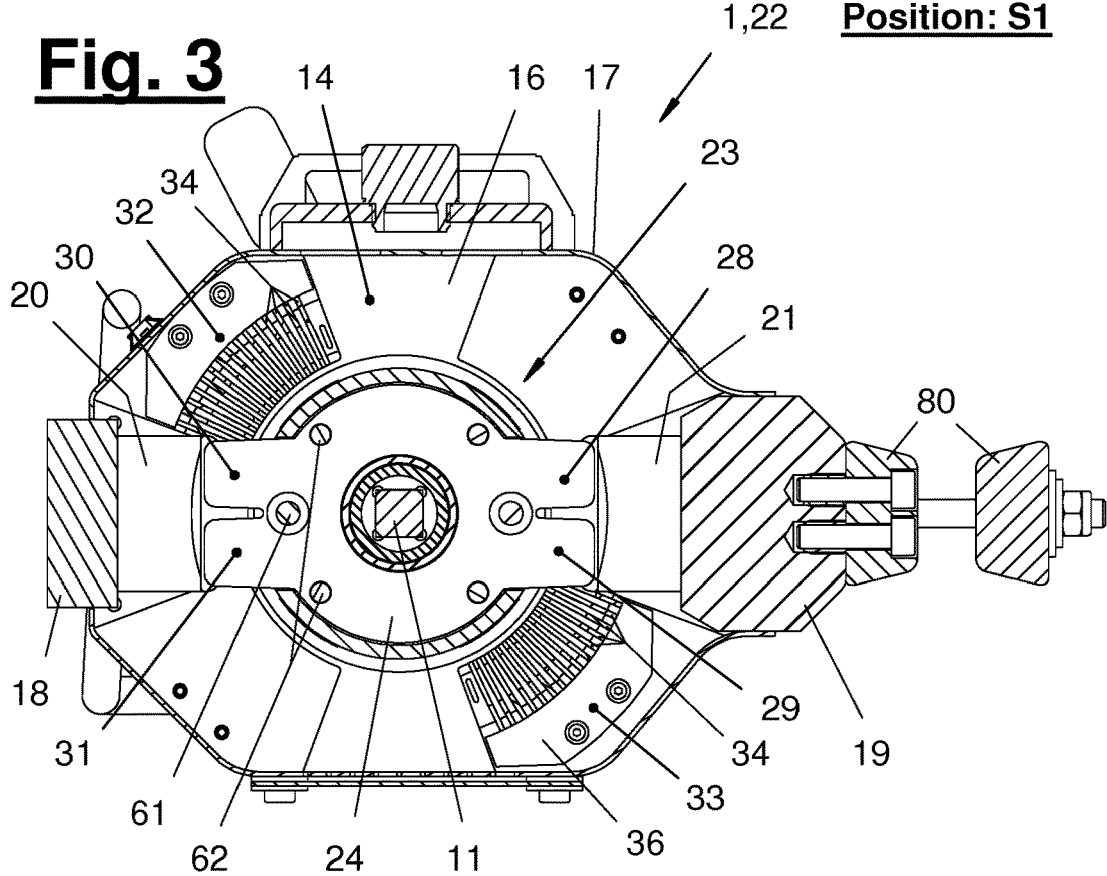
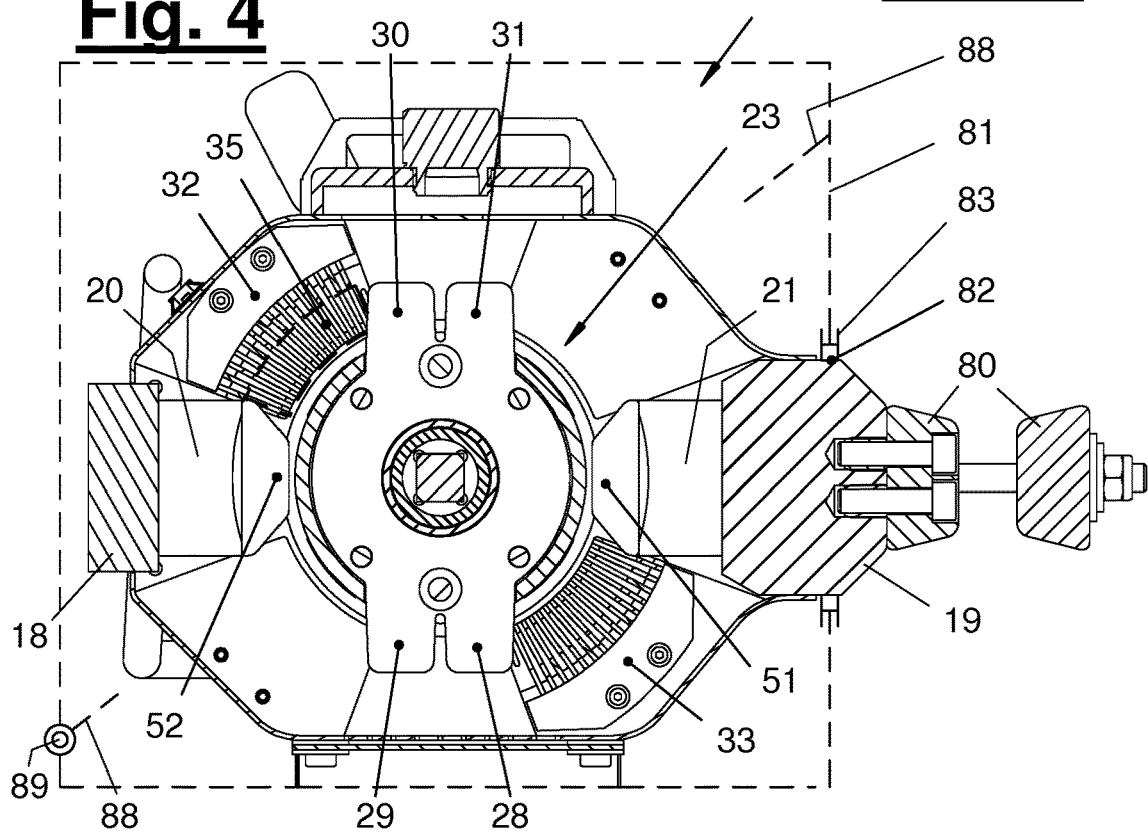

RESIDUAL LOAD CIRCUIT BREAKER

CROSS REFERENCE TO RELATED APPLICATIONS

This application is a United States National Phase Application of International Application, PCT/EP2018/070880, filed Aug. 1, 2018, and claims the benefit of priority under 35 U.S.C. § 119 of German Application 20 2017 104 597.8, filed Aug. 1, 2017, the entire contents of which are incorporated herein by reference.

TECHNICAL FIELD

The present invention pertains to a residual load disconnector switch technology for breaking an electrical connection under a residual current or a residual load at a feed point to a propulsion current supply conductor, especially a residual load disconnector switch and components thereof as well as to an operating method for a residual load disconnector switch. The present invention further pertains to a safety technology for the safe actuation and monitoring of a residual load disconnector switch.

TECHNICAL BACKGROUND

Some definitions and information for the use of disconnector switches, which will be summarized below, shall be taken into consideration for understanding the present disclosure and the relevant technical area.

A disconnector switch (also called breaker or disconnector) is to be distinguished from a normal switch or load switch (switch). Pure disconnector switches are used to break or to connect circuits in a currentless state. When a disconnector switch is in the closed state, high currents of 1,000 A or higher are sent through the disconnector switch. The disconnector switch is consequently a high-load component concerning the currents that can be sent through in the closed state, but it is a low-load component concerning the load that can be disconnected.

Opening of a disconnector switch while the main load is present is not intended and it leads, as a rule, to damage to or destruction of the disconnector switch or to other negative effects, which shall, in principle, be avoided, e.g., to the formation of an unacceptably intense arc, which may lead to fires or injuries. A disconnector switch thus has a task and configuration that are different from those of, for example, a contactor or a fuse.

A residual load disconnector switch, also known as a residual load disconnector represents a special variant of a disconnector switch. It may be opened or closed (just like the pure disconnector switch) in the currentless state. In addition, the residual load disconnector/residual load disconnector may be opened (and possibly closed) while applying a defined residual load, but the residual load is much lower than the main load, which is sent over the residual load disconnector switch in the closed state.

The residual load disconnector switch according to the present disclosure is used to isolate a propulsion current supply conductor for an electrically operated transport means from a residual load, which may be present after a main load has been switched off, such that a residual current cannot flow any longer from the feed line to the propulsion current supply conductor. The residual load disconnector switch is consequently intended and configured to break an electrical connection to a propulsion current supply conductor of a transport means, doing so in the currentless state or when at most a predefined residual load is present. The residual load disconnector switch conducts the main load, i.e., the propulsion current for the transport means to the propulsion current supply conductor, in the closed state. In the open state, the residual load disconnector switch prevents a current and especially the main load from being transmitted to the propulsion current supply conductor. The residual load disconnector switch according to the present disclosure may thus also be called a transport means residual load disconnector switch.

The feed line is connected, as a rule, via another main load disconnector switch to a voltage source. Main load currents, which reach, for example, up to 4,000 A to 6,000 A or more, may develop during a vehicle operation. The residual load disconnector switch transmits this main load current in the closed position from the feed line to the propulsion current supply conductor. The main load disconnector switch, which is not the subject of the present disclosure, is configured to break the electrical connection between the voltage source and the feed line even in the presence of the maximum main load.

When the main load disconnector switch is opened, the main load is no longer present at the residual load disconnector switch or the propulsion current supply conductor. However, a residual capacity in the feed line may cause a considerable residual current to still flow over the feed point into the propulsion current supply conductor despite the fact that the main load disconnector switch is opened, and this residual current may be dangerous to the life of a worker who touches the propulsion current supply conductor. To make it possible to carry out maintenance operations on the propulsion current supply conductor, this conductor must also be reliably disconnected from the residual load.

The residual load or the residual current may occur in a fixed range, especially in a range of up to 50 A and at voltages of up to 900 V or higher. The residual load preferably equals up to 5% of the main load, especially less than 3% of the main load. The residual load disconnector switch is configured to break the electrical connection at the feed point to the conductor rail when the maximum allowable residual current or the maximum allowable residual load is present.

In other words, the residual load disconnector switch is configured to transmit a main load current in the closed position and to be moved into an open position after switching off the main load while a residual load is present in order to completely break the electrical connection at the feed point to a propulsion current supply conductor.

The residual load disconnector switch does not have to be configured to break the electrical connection at the feed point to a propulsion current supply conductor while the main load is present. Rather, measures are proposed according to the present disclosure that effectively avoid an opening of the residual load disconnector switch while the main load is present.

Hitherto known residual load disconnector switches are used for supplying conductor rails for railborne vehicles and have no optimal configuration. They comprise, as a rule, an electrically conductive hand lever, which is mounted on one side and which is movable between a closed position and an open position by manual action. In the closed position the hand lever connects a feed contact to a rail supply contact. The hand lever has, as a rule, a length of about 1 m or is even longer and is arranged in a protective box at a rail section. Because of the large space requirement of the hitherto known residual load disconnector switches, these are accommodated, as an alternative, in a switch cabinet, which is built in the vicinity of the rail section and is connected to a conductor rail via separate connection cables. The actuation of the hand lever is possible in the prior-art residual load disconnector switches by applying a considerable amount of force only and it involves a risk of electrocution for the worker. In addition, serious accidents may occur when an incorrect disconnector switch is accidentally opened in a switch cabinet that comprises a plurality of residual load disconnector switches to different conductor rails or rail sections and a worker touches a conductor rail, whose corresponding residual load disconnector switch is still under the residual load.

A disconnector switch, which is configured for breaking an electrical connection to a conductor rail of an electric train, is known from DE 1 203 343 A. This disconnector switch has two rotary heads, at which separate contact blades projecting outwards on one side are arranged. To open or close the electrical connection, both rotary heads are set into a rotary motion in a synchronized manner. Rotation in both directions, i.e., a clockwise rotation to open the electrical connection, on the one hand, and, on the other hand, a counterclockwise rotation to close the electrical connection, are possible. The rotary positions of the rotary heads that can be reached are preset by a gear mechanism.

A load switch (English: switch) with a pivoting contact body, which is permanently in contact at one of its ends with a first stationary contact, is known from WO 2013/186433 A1. The pivot axis is formed at the connection point between the pivoting contact body and the first stationary contact. The free end of the pivoting contact body can be brought into contact with a second stationary contact by a pivoting motion in the clockwise direction. An opposite pivoting motion, i.e., in the counterclockwise direction, breaks the contact between the pivoting contact body and the second stationary contact. A to-and-fro motion of the pivoting contact body is consequently provided for opening and closing an electrical contact. The maximum attainable pivoted positions are set by stop surfaces at a housing of the pivoting contact body.

WO 2013/153279 A1, EP 2 936 525 B1 and US 2013/0153538 A1 disclose different load switches and fuses, which have a switch body each, which is pivotable about a pivot axis. The switch bodies disclosed are rotatable each in both directions, but the maximum pivoting range is limited by stops on both sides. The pivotable switch bodies are consequently pivotable in a first direction in order to close an electrical connection, and in an opposite direction in order to break the electrical connection again. Consequently, a to-and-fro motion of the pivotable switch body is provided for opening and closing an electrical contact.

SUMMARY

An object of the present invention is to provide an improved residual load disconnector switch.

The residual load disconnector switch according to the present disclosure has an especially compact configuration, a reliable switching characteristic, possibly the possibility of remote control and/or remote monitoring and an improved possibility of mounting. It may be mounted as a completely preassembled assembly unit together with a protective housing directly at a propulsion current supply conductor, so that it does not require a separate switch cabinet nor a separate foundation.

The residual load disconnector switch according to the present disclosure will be explained below. It is configured and intended to break an electrical connection to a propulsion current supply conductor. It has at least one feed line terminal and at least one switching device. The feed line terminal and the discharge line terminal may be parts of the switching device.

The feed line terminal is preferably connected to a (remote) main load disconnector switch and to a (remote) voltage source via a feed line. The discharge line terminal is preferably connected via a (near) rail terminal or a (near) overhead line terminal to a conductor rail or to an overhead line for an electrically operated transport means, for example, a train, a city and suburban train or a trolley. Generally speaking, the discharge line terminal can preferably be or is connected with a terminal to a propulsion current supply conductor. The propulsion current supply conductor is intended and configured to transmit the propulsion current for a transport means, especially a city and suburban train, for a train, a streetcar or a trolley. The residual load disconnector switch is correspondingly configured to transmit this propulsion current as a main load between the feed line terminal and the discharge line terminal in the closed state.

The switching device has at least one rotary switch body with at least one contact blade. The at least one contact blade is arranged rotatably about an axis, which extends between the feed line terminal and the discharge line terminal. The at least one contact blade has contact surfaces projecting on the end side in the radial direction. Two contact blades each are preferably combined to a prestressed pair. The contact surfaces at the contact blades can be brought into touching contact by a rotary motion both of a contact tongue at a feed line terminal and with a contact tongue at a discharge line terminal and be brought out of contact by a further rotary motion.

The contact surfaces are consequently in contact in a closed rotary position of the rotary switching body with the feed line terminal, on the one hand, and with the discharge line terminal, on the other hand. In an open rotary position of the rotary body, the contact surfaces are located at a spaced location from the feed line terminal and the discharge line terminal.

The residual load disconnector switch according to the present disclosure has a direction of rotation limited on one side for performing the switching motions. It is always moved in the same direction of rotation iteratively from a closed rotary position into an open rotary position and again into a closed rotary position, etc. The residual load disconnector switch can thus be actuated unidirectionally and cyclically. It is not necessary to carry out an otherwise usual to-and-fro motion or to drive the rotary switch body with a reversing motion in order to pass over from an open rotary position into a closed rotary position and back into an open rotary position.

The rotary switch body may consequently be moved always and exclusively in a first direction of rotation, for example, clockwise, in order to carry out a transition between two switching positions. An opposite motion, according to the example in the counterclockwise direction, is blocked.

In order words, (all) transitions between two switching positions are carried out, driven or triggered in the same direction of rotation at the residual load disconnector switch according to the present disclosure. The rotary positions, which are assumed at the beginning and at the end of a switching motion, may, however, be preset as fixed positions, especially at positions at which the contact surfaces of a contact blade are positioned in a preferred position at the feed line terminal and/or at the discharge line terminal.

Due to the limitation on one side of the direction of rotation or due to the unidirectional rotating actuation, it becomes possible to operate the residual load disconnector switch with an especially simple drive, especially a rotatory jump drive. The drive may have a unidirectional mobility. The to-and-fro motion of the switch body, which is otherwise common in disconnector switches, and a correspondingly necessary reversibility of the drive can be done away with. It is rather possible to carry out both switching motions, i.e., from a closed position into an open position as well as from an open position into a closed position, iteratively with only one drive, especially with a jump drive.

The rotary switch body may preferably be configured rotationally symmetrically in relation to the axis of rotation and the axis of rotation is preferably arranged centrally between the feed line terminal and the discharge line terminal. A closed rotary position is preferably oriented at right angles to an open rotary position. As an alternative, other orientations are possible between a closed rotary position and an open rotary position. The open rotary position(s) and the closed rotary position(s) are preferably arranged at uniform offset angles about the central axis, especially offset at 90° each or offset at 45°.

The rotary switch body may be prompted by any suitable technical means to change over from the closed rotary position into the open rotary position, especially by a so-called jump drive, which may have any desirable configuration. The jump drive is preferably configured as a rotary drive, which performs especially an iterative drive motion in always the same direction of rotation, namely, in exactly the direction of rotation in which the rotary switch body of the residual load disconnector switch can move.

The residual load disconnector switch with the aforementioned rotary switch body is especially well suited for a rapid and reliable breaking of the connection between the feed line terminal and the discharge line terminal, and the activation may be carried out both manually and in a controlled or motor-driven manner.

An electrical connection between the feed line terminal and at least one first contact surface at the at least one contact blade, on the one hand, and an electrical connection between the discharge line terminal and at least one additional contact surface at the at least one contact blade, on the other hand, are broken simultaneously at the time of a transition from the closed rotary position into the open rotary position. A load that is to be switched is distributed in this manner essentially in equal proportions between a first breaking point at the feed line terminal and a second breaking point at the discharge line terminal. This first breaking point and the second breaking point are connected in series via the contact blade. The breaking capacity is reduced for the feed line terminal and the discharge line terminal, so that the contact partners are exposed to a lower load. Smaller dimensions can correspondingly be selected for the aforementioned components than in the case of hitherto known residual load disconnector switches of a corresponding power class. The residual load disconnector switch according to the present disclosure is therefore especially compact and has a comparatively low weight.

Furthermore, a rotary switch body may have a plurality of contact blades and especially a plurality of pairs of contact blades, which are driven together and simultaneously and are connected electrically in parallel. The breaking capacity is thus also distributed over a plurality of contact zones at the at least one feed line terminal, which contact zones together form the first breaking point, as well as over a plurality of contact zones at the discharge line terminal, which form the second breaking point. This parallel connection of a plurality of contact zones also reduces the proportionate breaking capacity, which leads to a further reduction of the stress and/or to smaller possible dimensions of the switching device or of the residual load disconnector switch.

According to an especially preferred embodiment, the residual load disconnector switch has arc chutes arranged in a ring-like manner. The arc chutes may be arranged especially on the essentially circular path of motion, which the contact surfaces perform at the at least one contact blade when the residual load disconnector switch is displaced from the closed rotary position into the open rotary position. An arc chute each is especially preferably arranged behind the feed line terminal and behind the discharge line terminal in the rotary motion direction.

The arc chutes may have any desired configuration. They are preferably used to extinguish an arc, which may develop during the breaking of the electrical connection. An arc chute may preferably extend over a plurality of contact blades, especially two or more pairs of contact blades in the axial direction or in a radial plane to the axis of rotation of the rotary switch body. As a result, an especially effective and at the same time compact configuration of the arc chute is obtained.

An operating method according to the present disclosure is intended for operating a residual load disconnector switch, which has a rotatory jump drive, which can cause the rotary switch body of the residual load disconnector switch to perform a jump-like switching rotation. The residual load disconnector switch further has a load detection, which monitors a current flow and/or a voltage between the feed line terminal and the discharge line terminal of the residual load disconnector switch. The operating method may be used especially in connection with the residual load disconnector switch being claimed. It comprises at least the following steps.

A request to break the electrical connection at the residual load disconnector switch is received. The load, which is present at the residual load disconnector switch between the feed line terminal and the discharge line terminal, is checked, especially after receipt of the request. An abrupt rotary motion of the rotary switch body is triggered when it is determined that the load that is present at the residual load disconnector switch between the feed line terminal and the discharge line terminal is lower than (or equal to) the permissible residual load.

An improved possibility of remote control is achieved in different respects due to the operating method. On the one hand, it is achieved due to the load detection and the triggering of the rotary motion, which depends on the latter, that the disconnector switch is only actuated when the residual load criterion is met. An accidental actuation of the residual load disconnector switch while the main load is present or the permissible residual load is exceeded can be prevented. As a result, reliable operation of the residual load disconnector switch is guaranteed.

Due to the use of a rotatory jump drive, both the opening and the closing of the electrical connection can be carried out with only one drive and especially by remote control. A completely remote-controlled operation is thus made possible. Manual access to the residual load disconnector switch is not necessary albeit possible.

The residual load disconnector switch preferably comprises a position detection device, which is configured to detect the rotary position of the rotary switch body and/or the instantaneous switching position of the residual load disconnector switch, especially the presence of a closed rotary position or an open rotary position. The detected rotary position or switching position may be sent as a status notification via a communication interface of the residual load disconnector switch. Not only a remote control but additionally also a remote monitoring of the residual load disconnector switch are made possible in this manner.

The present invention is schematically shown in the figures as examples. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 3 is a sectional view of the residual load disconnector switch from FIG. 1;

FIG. 4 is a sectional view of the residual load disconnector switch from FIG. 1;

DESCRIPTION OF PREFERRED EMBODIMENTS

Figure 1:
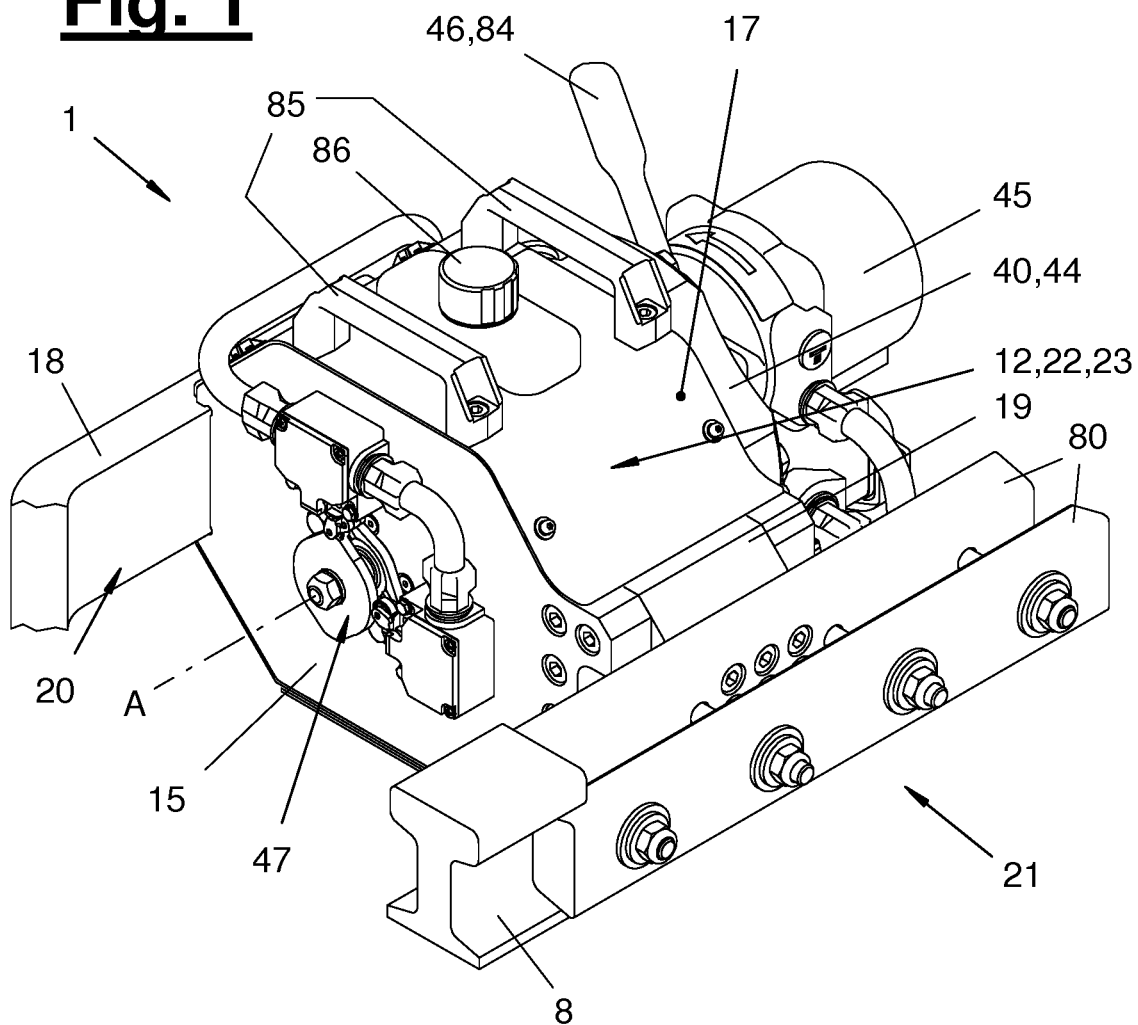
FIG. 1 is a perspective view of a residual load disconnector switch in a first embodiment variant.

Referring to the drawings, residual load disconnector switch (1) according to the present disclosure is shown in FIGS. 1, 10, 11 and 13 in two preferred embodiment variants. It comprises at least one switching device (22) as well as preferably a jump drive (40) and possibly a drive motor (45). The switching device (22) may preferably be present as a plurality of devices, especially as a first module switching block (12) and a second module switching block (13). As an alternative, three or more module switching blocks of the same or different configuration may be present.

Figure 5:
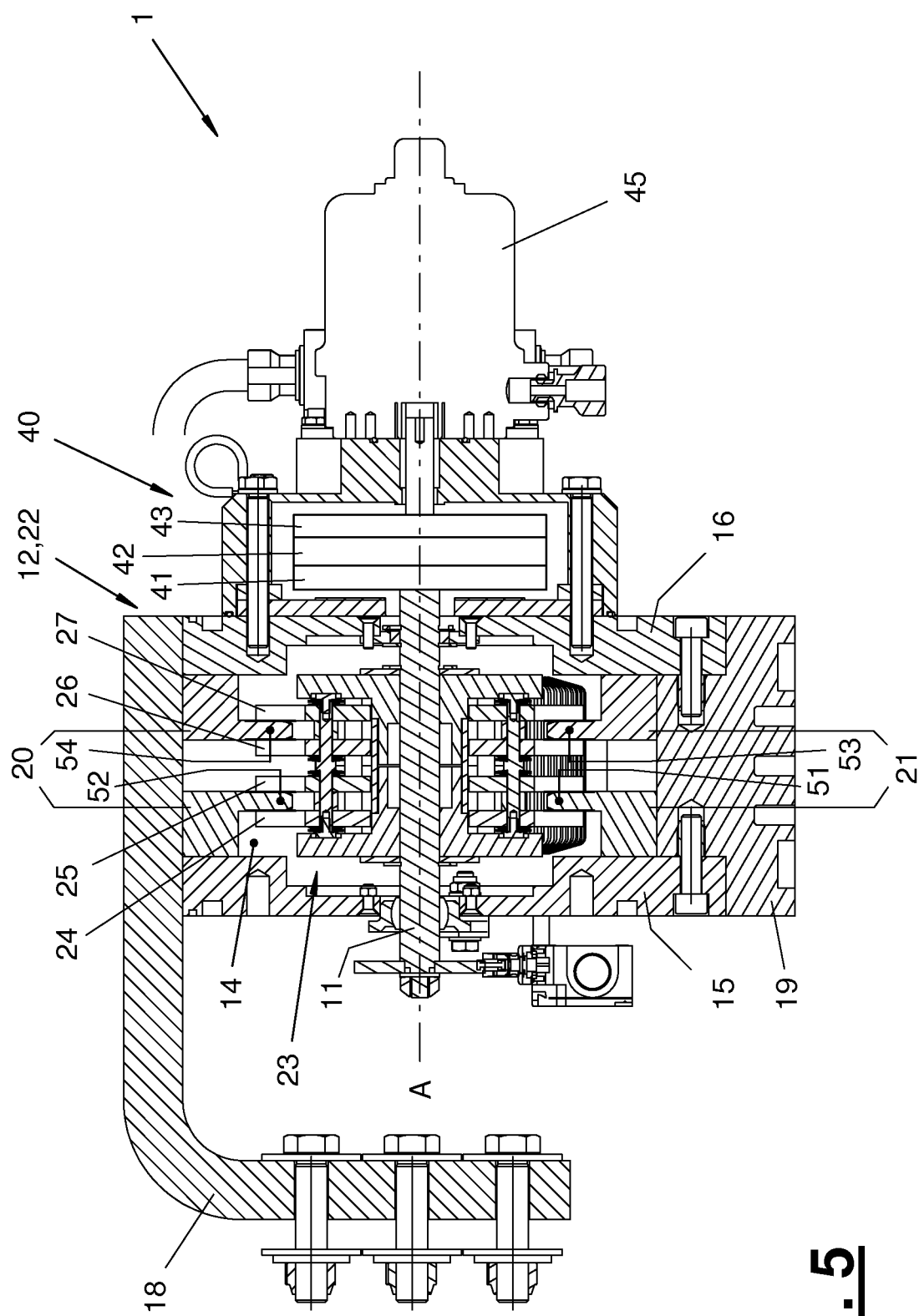
FIG. 5 is a sectional view of the residual load disconnector switch from FIG. 1.
Figure 6:
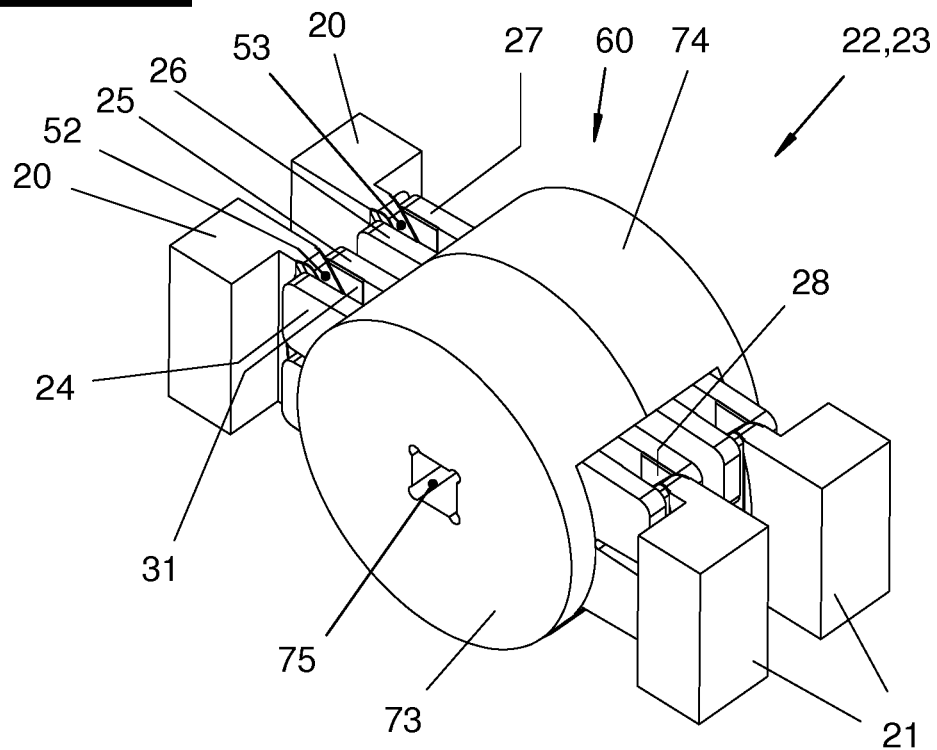
FIG. 6 is a detail view of a switching device with a rotary switch body.

The switching device (22) has an insulator chamber (14), in which a rotary switch body (23) as well as at least one feed line terminal (20) and at least one discharge line terminal (21) are arranged. The insulator chamber (14) may have any desired configuration. The insulator chamber (14) is formed in the examples shown by a first side wall and a second side wall (15, 16) (cf. FIGS. 5 and 12) as well as by one or more covers (17). The insulator chamber is sealed essentially against the entry of dust and moisture. It has, for example, on the underside, a labyrinth seal (not shown), and a ventilation (86) on the top side.

The at least one feed line terminal (20) and the at least one discharge line terminal (21) preferably pass through a wall of the insulator chamber (14), so that a feeding rail (18), on the one hand, and a feed-out collector (19), on the other hand, can be connected in an electrically conductive manner to the at least one feed terminal (20) and to the at least one discharge line terminal (21). The feeding rail (18) and/or the feed-out collector (19) may be part of the residual load disconnector switch (1). As an alternative, they may be separate components.

FIGS. 3 and 4 illustrate the transition of the rotary switch body (23) from a closed rotary position (S1) into an open rotary position (S2) in a sectional view. They further illustrate a preferred configuration and arrangement of arc chutes (32, 33).

The arc chutes (32, 33) may preferably have an identical configuration. As an alternative, they may have different configurations each.

According to the view in FIGS. 3 and 4, an arc chute (32, 33) may have the outer shape of a circular ring segment. Each of the circular ring segments is arranged along the path of motion of the contact surfaces (28, 29, 30, 31) at the at least one contact blade (24, 25, 26, 27), which are passed through during the transition from the closed rotary position (S1) into the open rotary position (S2). In the example according to FIG. 3, each of the circle segments covers an angle of rotation of about 50°. As an alternative, another segment angle may be covered, especially an angle in the range of 30° to 90°.

The open rotary position (S2) is preferably provided and fixed at an angle of 90° to the closed rotary position (S1). Maximum clearances are obtained in this manner between the contact surfaces (28, 29, 30, 31) at the at least one contact blade (24, 25, 26, 27) at the at least one respective feed line terminal (20) and the at least one discharge line terminal (21). The dimensioning of the contact blades (24, 25, 26, 27) and contact surfaces (28, 29, 30, 31) may be carried out such that the clear opening is greater than the minimum distance that is necessary for the disruptive strength.

Figure 11:
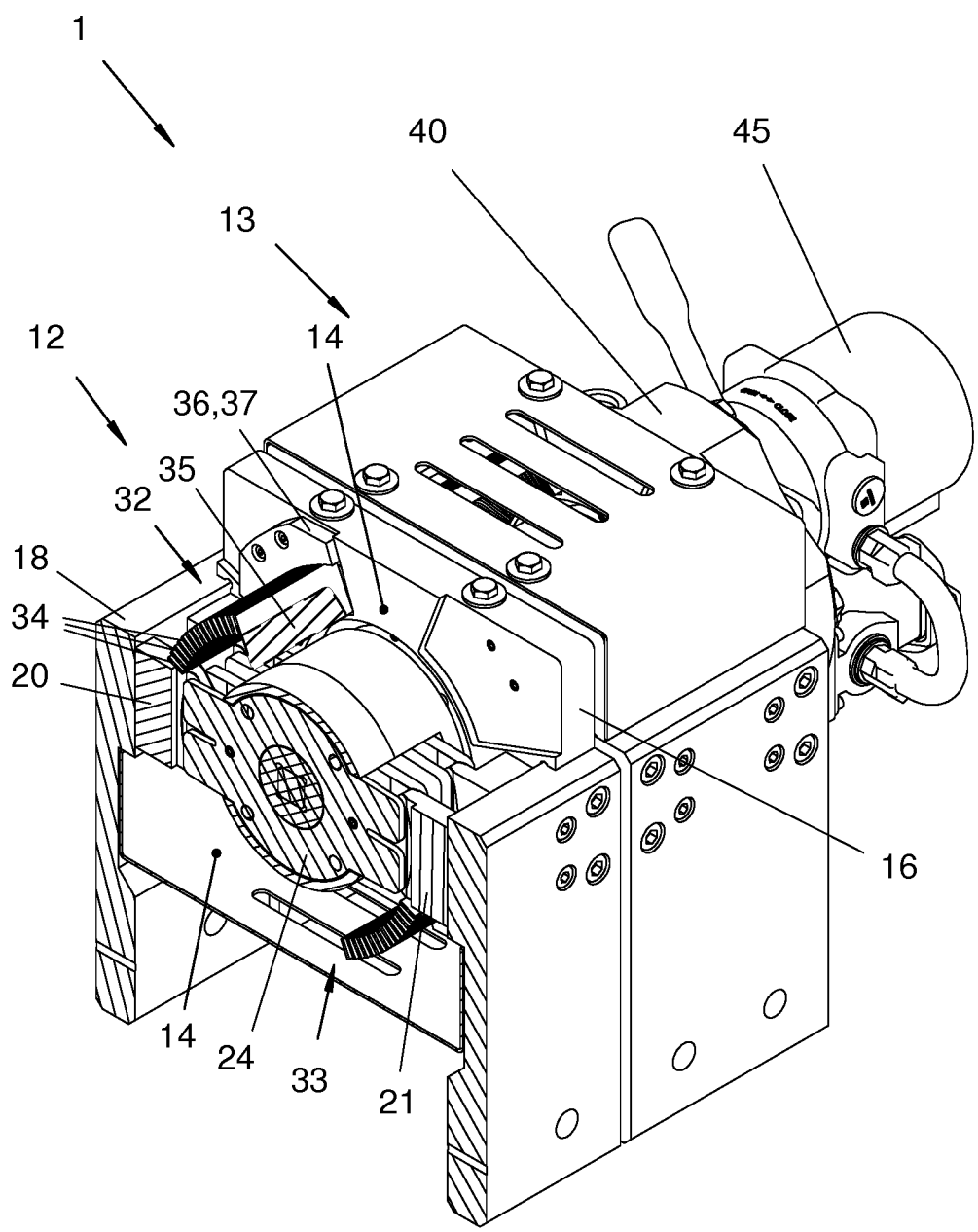
FIG. 11 is a partially cut-away view showing the residual load disconnector switch according to the second preferred embodiment.

FIG. 11 contains a perspective view of an arc chute (32) with a preferred configuration. The arc chute (32) is formed by an extinguishing cage, whose position can be positioned especially in relation to the rotary switch body (23). The positioning may be performed especially in relation to the side walls (15, 16) of an insulator chamber (14) or the switching device (22). An arc chute (32, 33), especially an extinguishing cage, preferably has a plurality of extinguishing plates (34) oriented essentially radially in relation to the axis of rotation (A) of the rotary switch body (23). The extinguishing plates (34) may preferably have an identical shape. They especially preferably have each a passage opening (35) pointing to the axis of rotation. The passage opening (35) preferably extends over a plurality of contact blades (24, 25, 26, 27) at the rotary switch body (23). An extinguishing cage is thus preferably provided, which is configured to extinguish one or more arcs, which may develop between a plurality of contact surfaces at the at least one contact blade (24, 25, 26, 27) and the feed line terminal (20), on the one hand, and the discharge line terminal (21), on the other hand, during the breaking of the electrical connection. Two or more passage openings (35) may be provided as an alternative. In particular, a passage opening (35) may be provided for each pair of contact blades (24, 25, 26, 27).

The extinguishing plates (34) of an arc chute (32, 33) are preferably arranged at a cage carrier. According to the view in FIGS. 3, 4 and 11, this preferably has two boundary surfaces (37) or limiting walls oriented at right angles to the axis of rotation (A). The extinguishing cage is preferably in an insulating contact with one of the side walls (15, 16) via these boundary surfaces.

The rotary switch body (23) is preferably put into the open rotary position (S2) by a rapid and abrupt motion from the closed rotary position (S1). This abrupt motion may be generated in any desired manner, especially by the jump drive (40) shown as an example in the figures. The jump drive (40) is configured to prompt the rotary switch body (23) to perform an abrupt switching rotation, while especially the complete rotary motion takes place between a closed rotary position (S1) and an open rotary position (S2) within a preset switching time. The preset switching time preferably equals up to 200 msec. As an alternative, other switching times may be provided, especially in a range of 100 msec to 300 msec.

The jump drive (40) may have any desired configuration. It preferably has a driven flange (41) connected to the rotary switch body (23) in a torque-transmitting manner, as well as an energy storage device (42) for the abrupt motion of the driven flange (41) and a drive flange (43) for charging the energy storage device (42). The jump drive is preferably configured as a rotatory jump drive. The motion of the driven flange (41) is preferably a rotary motion, especially an iterative and unidirectional rotary motion.

The drive flange (43) is moved, for example, by the (electrical) drive motor (45) and/or by a manual drive (46). The motion may take place essentially continuously, while the driven flange (41) is maintained either in the closed rotary position (S1) or in the open rotary position (S2). The movement of the drive flange (43) may take place especially as long as a sufficient amount of energy is contained in the energy storage device (42). The abrupt switching motion can then take place. The triggering may be immediate upon reaching the necessary charge in the energy storage device (42). As an alternative, the triggering may be delayed.

The residual load disconnector switch (1) and especially the jump drive (40) especially preferably have a triggering device (44), which is configured to trigger or to prevent the abrupt switching rotation as a function of one or more criteria. The triggering device (44) may be configured especially to prevent the abrupt switching rotation when the energy storage device (42) has an insufficient charge or prestress.

According to a preferred variant, the residual load disconnector switch has a load detection, which monitors an electrical load, especially a current flow and/or a voltage, between the feed line terminal (20) and the discharge line terminal (21). The load detection may be used for different purposes, especially for assessing the state based on the safety of a manual access, for blocking or unblocking a rotary position of the at least one rotary switch body (23), for triggering a switching rotation and/or for limiting a manual access. The load detection may compare a monitored electrical load at the residual load disconnector switch for the different purposes with one or more permissibility limit values.

It can be determined via the load detection, for example, whether a safety requirement for a manual access to the residual load disconnector switch is met. The safety requirement may make provisions, for example, for a manual access to be classified as nonhazardous only if the instantaneous load is below a first permissibility limit value, for example, a low-voltage limit value of 50 V. As an alternative, another value may be provided for a low-voltage limit value.

As an alternative or in addition, the load detection may be configured to determine whether a residual load or a residual current or a main load or a main current is present. A residual current or a residual load is preferably detected when the electrical load, especially the voltage and/or the current flow between the feed line terminal (20) and the discharge line terminal (21), is below a (second) permissibility limit value. The second permissibility limit value may be, for example, the limit value that is also used as a permissibility limit value for the release or triggering of a switching rotation. The second permissibility limit value may be especially the residual load limit value and equal, for example, 50 A/900 V. As an alternative, other values are possible, especially maximum voltages of up to 1,500 V and/or maximum currents of up to 100 A. Again, as an alternative, the second permissibility limit value may be a switching load limit value, which characterizes a maximum allowable electrical load, which is allowed to be present during a breaking of the electrical connection between the at least one feed line terminal (20) and the at least one discharge line terminal (21). The switching load limit value may differ from the residual load limit value.

Provisions are made in an especially simple and cost-effective variant of a load detection for an over- and undervoltage relay (92) to analyze a voltage present over the residual load disconnector switch (1), especially between the at least one feed line terminal (20) and the at least one discharge line terminal (21). When this voltage is above the first permissibility limit value, which is, e.g., 50 V (low-voltage limit value), it is determined that a certain state is present, which prompts a limitation of the manual access to the residual load disconnector switch (1). The access limitation may be brought about by any desired means. A first access limitation device may be a display device, which sends a warning about the uncertain state. The warning may be transmitted in any desired manner, for example, by a text display and/or suitable symbols.

As an alternative or in addition, an electrical supply connection to the drive motor (45) may be interrupted during an uncertain state, for example, by a relay contained in the over- and undervoltage relay (92) or another suitable switching device.

Likewise, as an alternative or in addition, a rotation blocking mechanism, which prevents a switching of the at least one rotary switch body (23), may be activated. A rotation blocking mechanism may be obtained by any desired means, especially by a mechanical blocking device. Provisions are made in a preferred embodiment for a mechanical blocking device for a safety bolt, a locking pin or the like to fix the at least one rotary switch body (23) and/or the driven flange (41) of the jump drive (40) in the direction of rotation in relation to a housing part of the residual load disconnector switch (1). The safety bolt or locking pin may be actuated, for example, by an electrical switching device, such as a solenoid. It may be acted on especially in an unblocking direction by an elastic prestressing force and displaced by the electrical switching device in the blocking direction when or as long as the uncertain state is determined.

Again, as an alternative or in addition, a protective housing (81) of the rotary disconnector switch (1) may be blocked in a controlled manner when or as long as the uncertain state is present. A similar blocking device or the same blocking device that was explained above in connection with the blocking of the rotation of the rotary switch body (23) may be used for this purpose. As an alternative, a controllable lock (98) may be used (cf. FIG. 14). The protective housing (81) and further safety aspects will be explained below.

The presence of a main load or of a main current is preferably detected when at least one of the aforementioned limit values is exceeded, especially when a residual load limit value or a switching load limit value is exceeded.

Provisions may be made according to a preferred embodiment for checking for the overshooting or undershooting of a corresponding preparatory limit value in addition to the overshooting of a low-voltage limit value or in addition to the overshooting of a residual load limit value, especially by the load detection of the residual load disconnector switch (1). The preparatory limit value may have a value different from the low-voltage limit value or from the residual load limit value. In particular, it may be greater by a hysteresis threshold value than the low-voltage limit value or residual load limit value. The preparatory limit value may equal, e.g., 55 V, while the low-voltage limit value equals 45 V. As an alternative or in addition, the aforementioned limit values may be set via a current value or a power value or another suitable parameter for determining a load.

The value range in which an instantaneous load is present at the residual load disconnector switch (1) can be determined even more accurately by the use of two limit values belonging together, which are spaced apart by a hysteresis threshold value. It is possible to carry out, in particular, a case differentiation for determining an instantaneous load case, where the necessary steps are carried out for the preparation for, the carrying out and checking of a switching staggered in time as a function of the load case determined. When, for example, an instantaneous load of 100 V is present, it would be determined that the load present is above the low-voltage limit value and above the preparatory limit value. This load case can be assessed as an exclusion load case, in which any manual access to the residual load disconnector switch is prevented.

When a load of 50 V is present, i.e., in general terms an instantaneous load that is lower than the preparatory limit value, it would be determined that a transition load case is present. Breaking of the electrical connection can be refused at least temporarily in the transition load case. However, preparatory steps may be taken, such as the charging of the electric motor (45) and/or the unlocking of the controllable lock (98).

When an instantaneous load of 40 V, i.e., in general terms an instantaneous load that is below the low-voltage limit value as well as below the preparatory load case, is determined according to the above example, it is determined that a release load case is present, in which a received request for breaking the electrical connection is implemented directly and manual access to the residual load disconnector switch can be granted directly.

A distinction of load cases by the use of two limit values, which are spaced apart from one another by a hysteresis threshold value, may be provided once or several times for breaking as well as for establishing the electrical connection. Further, a switching from the closed rotary position into the open rotary position and/or from the open rotary position into the closed rotary position may take place in at least two phases, which will be explained below on the basis of an example.

A request received for breaking the electrical connection at the residual load disconnector switch (1) may lead to a reaction in two phases, especially during a preparatory phase and in a triggering phase. Steps may be taken in the preparatory phase for preparation for a switching motion, and the preparatory phase preferably has a maximum preset duration. The actual switching, i.e., the breaking or the establishing of the electrical connection, may take place during the triggering phase. In addition, the switching state reached subsequently and/or the next instantaneous load can be monitored during the triggering phase. A transition from the preparatory phase into the triggering phase may take place when and as long as it is determined within the predefined time period of the preparatory phase that the preparatory steps are concluded and the instantaneous load is (still or in the meantime) below a permissibility limit value, especially below the residual load limit value or the low-voltage limit value.

As an alternative or in addition, the breaking or establishing of an electrical connection may be made contingent upon an additional external input, especially on the receipt of an additional breaking confirmation or switch-on confirmation.

If one of the necessary conditions (conclusion of preparatory steps, undershooting of the permissibility limit value, receipt of the confirmation) does not materialize or disappears during the preparatory phase, triggering of the switching can be refused. When a new request for breaking or establishing the electrical connection is received, the above-mentioned procedure can be carried out anew.

The initiation of the preparatory phase and/or the conclusion of the preparatory steps and/or the additional undershooting of the permissibility limit value and/or the (successful) conclusion of the triggering phase and/or any possibly occurring states of error may be displayed in a preferred embodiment by one or more status messages at the residual load disconnector switch (1) and/or by sending the status message(s). The reproducibility of the state can be markedly improved hereby at the residual load disconnector switch (1) for a user.

Provisions may also be made for a splitting of the performance of a switching confirmation into a preparatory phase and a triggering phase when checking only one permissibility limit value, especially the residual load limit value. A switching from the preparatory phase into the triggering phase may take place in this case when and if the preparatory steps are concluded within the preset time period and the instantaneous load continues to be (or remains uninterruptedly) below the residual load limit value and/or when or if a breaking confirmation is additionally received. A switching confirmation may comprise here a breaking of the electrical connection and likewise a closure of the electrical connection.

It can be checked at the end of the triggering phase whether the instantaneous load at the residual load disconnector switch (1) drops below or has dropped below a breaking state limit value. The breaking state limit value may be a voltage limit value according to the above examples and/or a current limit value or a power limit value, especially the above-mentioned low-voltage limit value. When the instantaneous load drops below the breaking state limit value after the switching of the rotary switch body into the open rotary position, it is determined that the electrical connection between the feed line terminal (20) and the discharge line terminal (21) is indeed broken and a reliable state is thus reached. A successful conclusion of the triggering phase can be determined and displayed or communicated when it is determined, on the one hand, that the rotary switch body (23) or the rotary switch bodies (23) has/have reached the open rotary position and, on the other hand, the instantaneous load has dropped below the breaking state limit value. If one of these conditions is not met or is not met within a preset time period, a state of error can be detected and displayed or sent as a status message.

The establishment of an electrical connection can be prevented when the rotary switching body (23) is in the open rotary position and it is determined that the instantaneous load exceeds the breaking state limit value, or when it is determined that the instantaneous load exceeds the residual load limit value.

As an alternative or in addition to the above explanations, the presence of a main load can be detected by polling a switching state of a (remote) main load disconnector switch (3), which will be explained below. The polling of the switching state of the main load disconnector switch (3) is preferably carried out by exchanging data messages, especially with a (remote) monitoring station (US).

Figure 2:
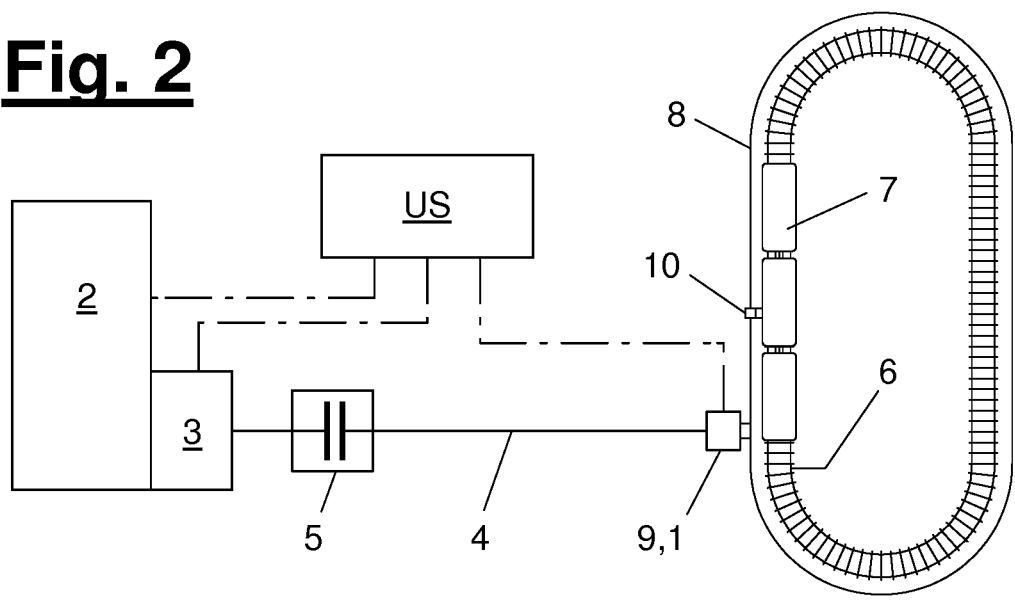
FIG. 2 is a schematic view of the power supply for an electrical transport means with a propulsion current supply conductor.

FIG. 2 shows a power supply for an electrically operated transport means (7) in a schematic view. The electrical transport means (7) is a train or a city and suburban train in this case, which travels on rails or on a line section (6). The electrical transport means (7) receives its propulsion current via a current collector (10) from a propulsion current supply conductor (8), which is configured as a conductor rail in this case.

The propulsion current supply conductor (8) is connected at a feed point (9) to a feed line (4) via the residual load disconnector switch (1) according to the present disclosure. The feed point (9) is thus the supply conductor feed point.

The feed line (4) may have a great length, for example, a length of several km. It leads to a voltage source (2), which establishes the main load current supply or the power supply for the vehicle operation. The main load disconnector switch (3) is arranged, as a rule, at the voltage source (2) or in the vicinity of the voltage source (2). The electrical line connection between the main load disconnector switch and the propulsion current supply conductor (8) may have a considerable residual capacity (5), which is illustrated as a capacitor here. A majority of this residual capacity (5) is frequently in the area of the feed line. A load, especially the permissible residual load, which is to be isolated by the residual load disconnector switch (1) according to the present disclosure electrically from the propulsion current supply conductor (8), may still be present at the feed point (9) or at the propulsion current supply conductor (8) for some time even after the opening of a main load disconnector switch (3) due to this residual capacity (5).

A monitoring station (US), which is connected in terms of data technology to the voltage source (2) and/or to the main load disconnector switch (3) and/or to the residual load disconnector switch (1) according to the present disclosure, is possibly present. The monitoring station can poll the switching state of the main load disconnector switch or determine in another manner whether the main load is present at the feed point (9). The triggering device (44) can obtain information from the monitoring station (US) on whether the main load is present or not and prevent a switching motion of the rotary switch body (23) when the main load is present. As an alternative, there may be a direct communication between the triggering device (44) and the main load disconnector switch (2) in order to obtain information on the switching state of the main load disconnector switch (2).

The embodiment variants of the residual load disconnector switch (1) shown in the figures are configured to be able to be actuated by the motor drive (45), on the one hand, and by a manual drive (46), on the other hand. Actuation by the motor (45) may take place, for example, as follows:

A request for breaking the electrical connection at the feed point (9) is received from an external signal transmitter. The request may be generated, for example, by the monitoring station (US) or by a confirmation device at the line section (6). According to an optional step, the residual load disconnector switch (1) and especially the triggering device (44) check whether a main load is present.

The motor (45) is operated in order to charge the jump drive (40) or the energy storage device (42) contained in it, especially under the condition that it was determined that no main load but at most a residual load is present.

An abrupt rotary motion is triggered, so that the rotary switch body (23) is moved from the closed rotary position (S2) into the open rotary position (S1). The abrupt rotary motion is triggered when and especially as soon as the energy storage device (42) has reached the specified charge. As an alternative, the abrupt rotary motion is triggered under the conditions that a load detection has determined that only the permissible residual load is present between a feed line terminal (20) and the at least one discharge line terminal (21) but the main load is not.

As an alternative or in addition, the jump drive (40) may be charged by an actuation of the manual drive (46), especially an iterative motion of a ratchet lever (84). The abrupt motion can be triggered in this case as well as soon as the specified charge into the energy storage device is reached. It addition, it can be checked that no main load but at most the permissible residual load is present at the time of the triggering.

In other words, the triggering device (44) is preferably configured to allow a manual and/or motor-induced actuation of the switching device (22) only if at most the allowable residual load is present.

According to an aspect described below, the load detection may also be used to make an access to the residual load disconnector switch (1) and especially to the manual drive (46) or the ratchet level (84) contingent upon the fact that only a permissible residual load is present but the main load is not.

The manual drive (46) may have any desired configuration. In a preferred embodiment variant, it acts on the drive flange (43) of the jump drive especially in a mechanical superimposition to the drive motor (45). The residual load disconnector switch (1) and especially the drive motor (45) or the jump drive (40) especially preferably has a reducing gear. The manual drive (46) may act via this reducing gear on the drive flange (43) of the jump drive (40), so that only weak manual forces are necessary to charge the jump drive (40). Any desired tool that can be gripped by hand may be provided for actuating the manual drive. This is preferably a ratchet lever (84), which can be moved to perform a to-and-fro motion. As an alternative, a hand crank may be provided, which may likewise have (optionally) a ratchet mechanism. A ratchet mechanism has the advantage that the actuating tool is not moved along during a motor actuation of the jump drive.

Figure 10:
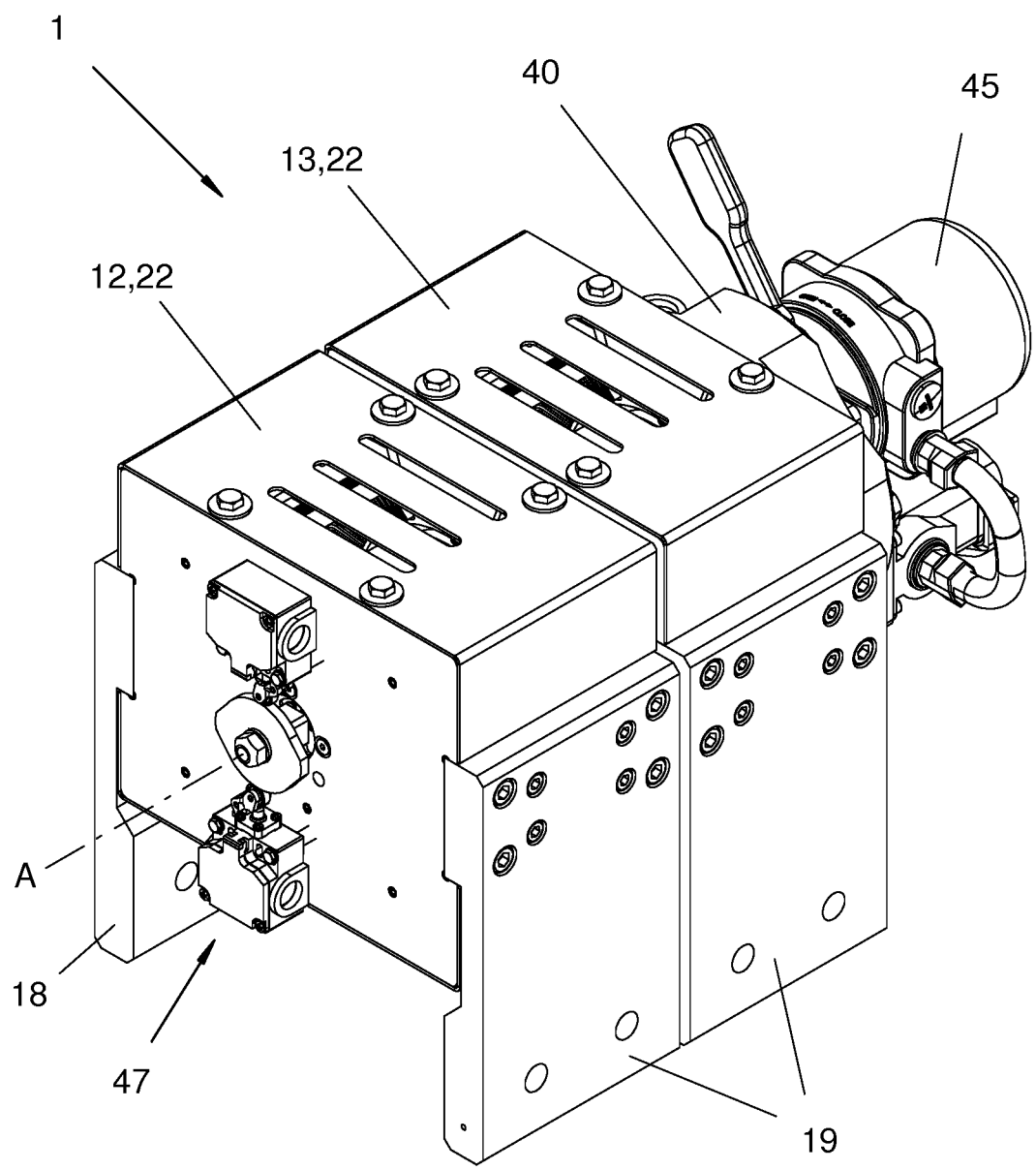
FIG. 10 is an external perspective view showing a residual load disconnector switch according to a second preferred embodiment variant.

According to the view in FIGS. 1 and 10, the residual load disconnector switch (1) according to the present disclosure preferably has a position detection device (47), which is configured to detect the rotary position of the at least one rotary switch body (23) and the presence of a closed rotary position (S1) or of an open rotary position (S2). The position detection device (47) may have any desired configuration. In the view according to FIGS. 1 and 10, the position detection device (47) is formed by a cam plate detection. A cam plate is arranged on the axis of rotation (A) and is connected to the at least one rotary switch body (23) in a torque-transmitting manner. The cam plate has at least one and preferably two cams, which actuate one or more contact switches arranged on the circumference of the cam plate. A first contact switch is pressed in by a cam in the example according to FIG. 1, whereas a second contact switch is not pressed in. The second contact switch is arranged at right angles to the first contact switch in relation to the axis of rotation (A). The presence of a closed rotary position (S1) or of an open rotary position (S2) is detected here when one of the contact switches is activated and the other contact switch is not activated according to a known coding. However, the rotary switch body (23) is in an intermediate position when neither of the two contact switches is activated.

It can be additionally detected by the position detection device (47) on the basis of such an intermediate position whether the rotary switch body (23) is outside the closed rotary position (S1) and outside the open rotary position (S2) for a sufficiently long time. A state of alarm, which may be transmitted, for example, to the monitoring station (US), may be triggered in such a state. Further, manual access to the residual load disconnector switch may be limited in such a case.

The residual load disconnector switch or the at least one rotary switch body (23) preferably has a direction of rotation limited on one side for performing the switching motion(s). For example, a rotation to the right can thus always and exclusively be provided in the example according to FIGS. 3 and 4 in order to move the rotary switch body (23) iteratively from a closed rotary position (S1) into an open rotary position (S) and again into a closed rotary position (S1), etc. It is sufficient in this case to arrange an arc chute only on the trailing side of a feed line terminal (20) and of a discharge line terminal (21), i.e., in the tangentially adjoining area, which is traversed by the contact surfaces (28, 29, 30, 31) according to the predefined unidirectional direction of rotation during the switching from a closed rotary position (S1) into an open rotary position (S2). By contrast, an arc chute may be done away with on the leading side, because, according to the predefined direction of rotation, an arc is not expected to develop.

An especially simple controllability and monitorability of the residual load disconnector switch (1) is achieved due to the preferred unidirectional and cyclic actuation of the rotary switch body (23). In particular, no direction-reversing gear and likewise no direction of rotation reversal control are necessary. Rather, both the breaking of the electrically conductive connection at the residual load disconnector switch (1) and at the switching device (22) as well as a restoration thereof can be triggered with a single rotating motor (45), which is driven in a single direction of rotation. The jump drive (40) is correspondingly preferably configured to trigger iterative abrupt rotary motions in the same direction of rotation at constant angle intervals. The angle intervals may especially equal 90° each.

According to an alternative embodiment, rotary mobility of the rotary switch body (23) in both directions may be provided. The breaking of the electrical connection, i.e., the switching between a closed rotary position (S1) and an open rotary position (S2), can take place in this case in a first predefined direction of motion and the closing of the electrical connection in the opposite direction, which likewise causes that arc chutes must be provided only on the trailing side of the direction of motion intended for the breaking. Likewise, as an alternative, a free direction of motion of the rotary switch body (23) may be provided. Arc chutes may be provided in this case in both tangentially adjoining areas next to a feed line terminal (20) and a discharge line terminal (21).

FIGS. 6 through 9 illustrate a preferred embodiment variant of the switching device (22) and of a rotary switch body (23). The rotary switch body (23) has at least one pair and preferably two pairs of contact blades (24, 25, 26, 27). Two contact blades (24, 25/26, 27) each are correspondingly arranged parallel and coaxially to the axis of rotation (A). A pair of contact blades (24, 25/26, 27) is configured for jointly contacting a feed line terminal (20), on the one hand, and a discharge line terminal (21), on the other hand. A contact tongue (51, 52, 53, 54) each, which is received in a closed rotary position (S1) between the pair of contact blades (24, 25/26, 27), touching them (cf. FIG. 6), is preferably provided at the feed line terminal (20) and at the discharge line terminal (21).

A contact blade (24, 25, 26, 27), especially each of the contact blades, preferably has a first multiple arrangement of contact surfaces (28, 29) for touching a contact tongue (51) at the feed line terminal (20) and another multiple arrangement of contact surfaces (30, 31) for touching a contact tongue (53) at the discharge line terminal (21). The formation of redundant electrical contact zones is facilitated by the formation of pairs of contact blades, on the one hand, and by the multiple arrangement of contact surfaces, on the other hand. According to the view in FIG. 6, each contact tongue (51, 52, 53, 54) with a total of four contact surfaces may be in touching contact with a pair of contact blades (24, 25/26, 27). The surfaces touching each other are preferably provided with an electrically highly conductive coating, especially with a silver coating or silver plating.

Figure 7:
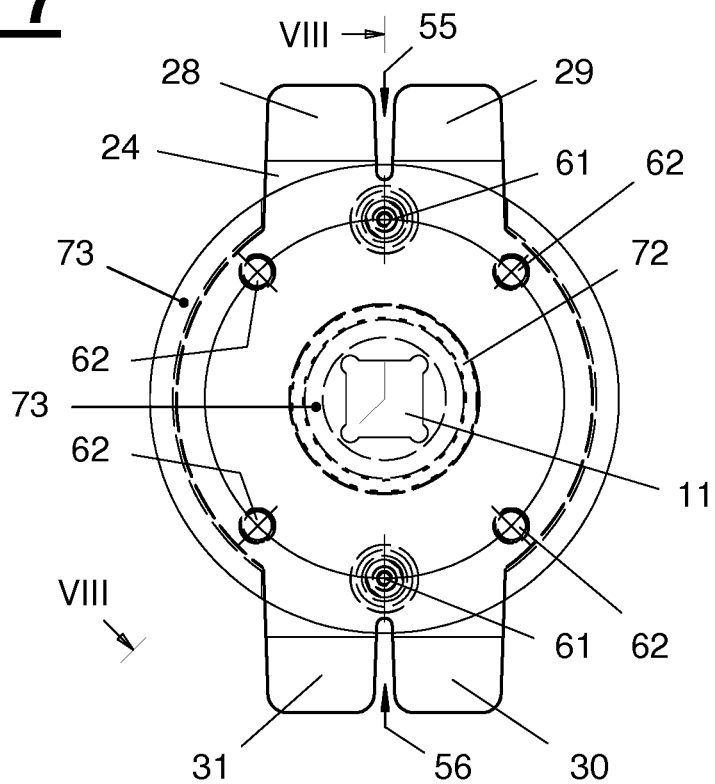
FIG. 7 is a side view of a rotary switch body.

According to the view in FIG. 7, the contact surfaces (28, 29/30, 31) are separated, especially physically separated in a multiple arrangement, preferably by an intermediate recess (55, 56) of material. In the preferred embodiment according to FIG. 7, each multiple arrangement comprises exactly two contact surfaces (28, 29/30, 31), which are arranged especially symmetrically to a recess (55, 56) of material. This arrangement proved to be optimal for making a mechanical surface pressure uniform between the plurality of contact zones and thus to facilitate homogeneous contact resistances in the contact zones. If more than two contact surfaces (28, 29/30, 31) are provided in a multiple arrangement, additional recesses of material may correspondingly be provided.

The rotary body (23) preferably has an (insulating) housing (60), which may have a one-part or multipart configuration. One or more pairs of contact blades are fixed in the radial direction and mounted with a clearance in the axial direction on or in the housing (60). The tolerance for a (local) mobility of a contact blade in the axial direction may be limited by suitable devices.

A rotary position of the contact blades (24, 25, 26, 27) is unambiguously set by the rotary position of the housing (60) due to the radial fixation, while the contact blades (24, 25, 26, 27) are movable in the axial direction (parallel to the axis of rotation A) at least in a predefined tolerance range in order to be able to move as much as possible into an optimal touching position to the contact tongues (51, 52, 53, 54). The assumption of the optimal touching position during the transition into the closed rotary position (S2) is brought about preferably by a mechanical prestress of the contact blades and by guide slopes at the contact surfaces and/or at the contact tongues, which will be explained below with additional details.

Figure 8:
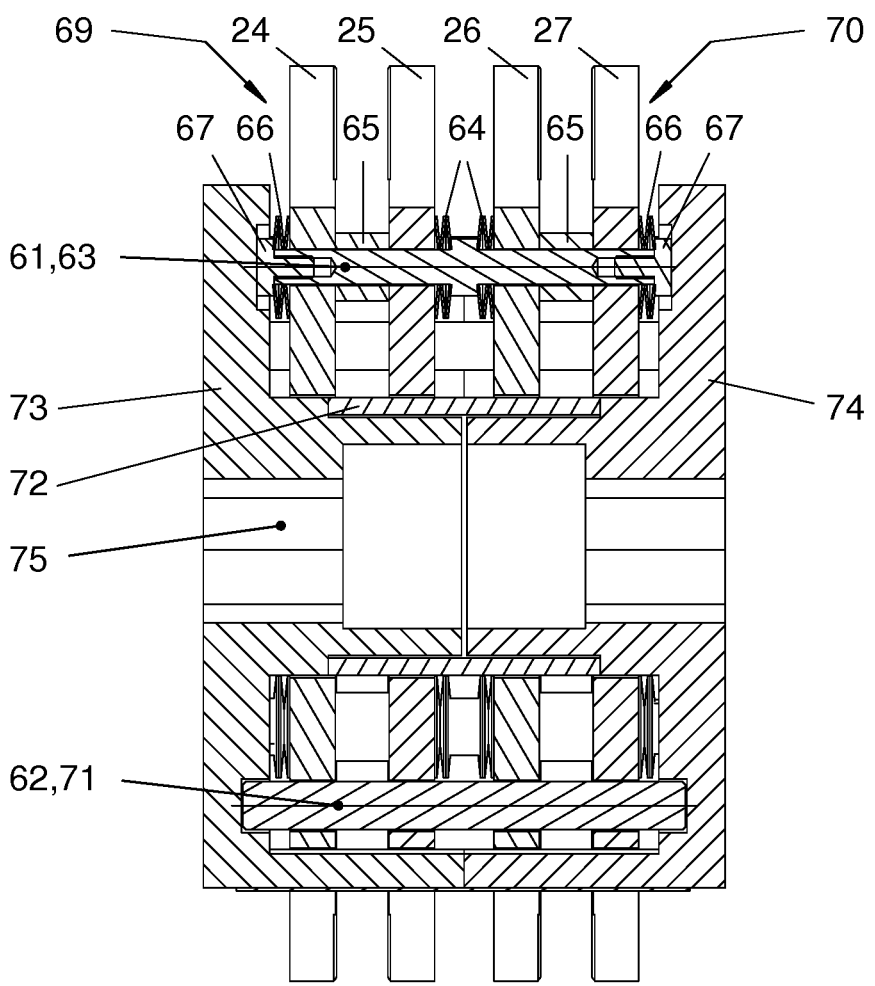
FIG. 8 is an overall sectional view of the rotary switch body according to section line VIII-VIII from FIG. 7.
Figure 9:
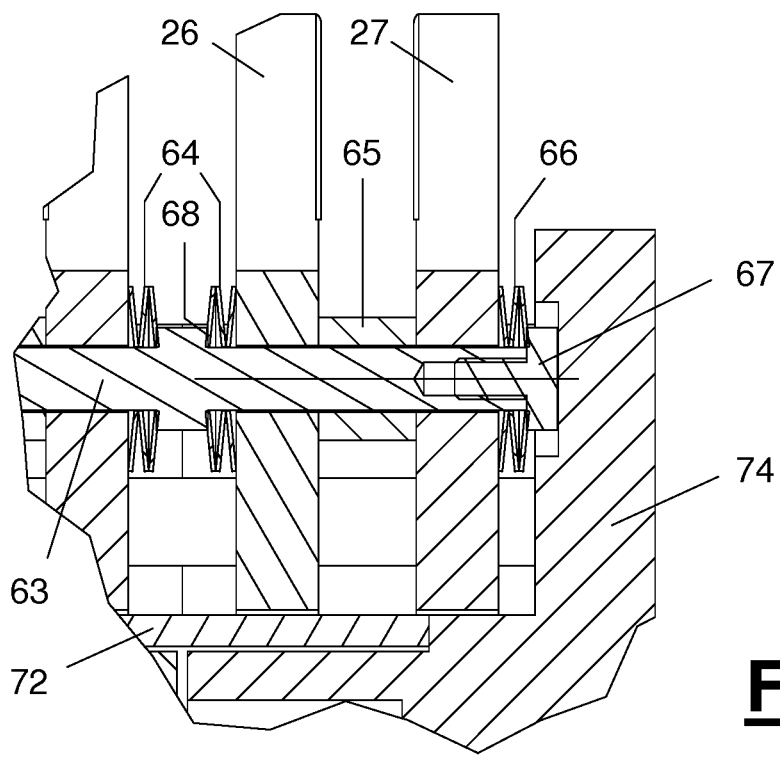
FIG. 9 is an enlarged sectional view of the rotary switch body according to section line VIII-VIII from FIG. 7.

According to the view shown in FIGS. 7 through 9, at least one axial mounting element (61) and at least one radial mounting element (62) that is independent thereof may be provided at the rotary switch body (23). The axial mounting element (61) is configured to receive the contact blades (24, 25/26, 27) of a pair and to position them with an axial clearance relative to one another and especially to prestress them. The prestress is directed especially towards the inner side of the pair, i.e., always to a central plane between the contact blades (24, 25/26, 27) of a pair. The pair as a whole can move in the axial direction (parallel to the axis of rotation A), especially in itself alone or together with another pair. This means that there preferably is an internal mobility of the contact blades (24, 25/26, 27) in a pair as well as a global mobility of the pair or of a plurality of pairs, which may each be subject to different tolerances.

The at least one radial mounting element (62) is configured to fix one or more contact blades (24, 25, 26, 27) of a rotary switch body (23) in the radial direction, i.e., to connect it to the housing (60) in a torque-transmitting manner. The radial mounting element (62) preferably has no mounting effect in the axial direction, i.e., parallel to the axis of rotation (A).

Preferred embodiments of an axial mounting element (61) and of a radial mounting element (62) are shown in a sectional view in the sectional view shown in FIG. 8. The sectional view pertains to a section line VIII-VIII in FIG. 7. FIG. 9 shows an enlarged view of the right upper area of FIG. 8.

An axial mounting element (61) is formed here by a supporting bolt (63), at least one spring element (64, 66) and a spacer (65). Moreover, the axial mounting element may comprise one or more fastening devices (67, 68). Preferably mechanical springs, especially disk springs and disk spring assemblies are considered for use as spring elements (64, 66). According to the view in FIG. 8, two tensioned mounting devices (69, 70), which mount and prestress each a pair of contact blades (24, 25/26, 27), are formed at the supporting bolt (63). As an alternative, only one or any other desired number of mounting devices (69, 70) may be provided at a supporting bolt (63).

The mounting device (69, 70) shown comprises in the axial direction (A) a layered arrangement of a first spring element (64), of a first contact blade (24), of a spacer (65), of a second contact element (25) as well as optionally of a second or additional spring element (66). For example, a sleeve, which is placed on the supporting bolt, is used as a spacer (65) here. The mounting device (69, 70) is brought into contact with an overhang of the supporting bolt towards the inner side in the example shown in FIGS. 8, 9), which overhang forms a first fastening device, and it is fixed outwards by a screw, which forms a second fastening device (67). As an alternative, any other desired fastening device may be provided, for example, snap rings, locking pins, shaft nuts, welded-on projections, etc.

The contact blades (24, 25/26, 27) in a tensioned mounting device (69, 70) are brought into contact by the one or more spring elements (64, 66) with a prestress within the open rotary position with the spacer (65) located in between.

The spacer thus defines the minimum clearance between the contact surfaces (28, 29/30, 31). During the transition into the closed rotary position (S2), the contact surfaces (28, 29/30, 31) come into touching contact with an associated contact tongue (51, 52, 53, 54), especially via guide slopes. The minimum clearance between the contact surfaces (28, 29/30, 31) is preferably smaller than the width of the associated contact tongue (51, 52, 53, 54), so that the contact blades (24, 25, 26, 27) are moved apart or spread apart while sliding on a contact tongue (51, 52, 53, 54) against the prestress of the spring elements (64, 66). The one or more spring elements (64, 66) are elastically compressed in the process, so that they continue to maintain the prestressing force on the contact blades (24, 25, 26, 27) and the contact surfaces (28, 29, 30, 31) even further. A contact zone, in which the touching contact is preferably maintained with mechanical prestress, is formed by each touching contact between a contact tongue (51, 52, 53, 54) and a contact surface (28, 29, 30, 31).

According to the lower half of FIG. 8, a radial mounting element (62) may preferably be formed by a guide pin, which is fixed at the rotary switch body (23), especially at the housing (60), in the direction of rotation and fixes at least one contact blade (24, 25, 26, 27) in relation to the rotary body (23) in the radial direction. The at least one contact blade is preferably mounted axially movably on the guide pin (71). The guide pin (71) itself may be fixed in the axial direction at the housing (60). The radial mounting element (62) thus preferably allows both an internal motion of the contact blades in the axial direction among one another and a global motion of the contact blades as a whole in relation to the housing (60).

The axial mounting elements (61) and radial mounting elements (62) may be provided in any desired number and arrangement at the rotary switch body (23). FIG. 7 shows an especially preferred arrangement. Two axial mounting elements (61) are provided here. These are arranged on a common symmetry line on both sides of the axis of rotation (A) and close in space to the multiple arrangements of contact surfaces (28, 29/30, 31). In particular, exactly one axial mounting element (61) is provided in the vicinity of exactly one multiple arrangement of contact surfaces (28, 29/30, 31) and especially approximately on a center line of the respective multiple arrangement. The prestressing force applied by the axial mounting element (61) and especially by the spring elements (64, 66) is thus distributed essentially uniformly among the plurality of contact surfaces (28, 29/30, 31) of the respective multiple arrangement.

Further, four radial mounting elements (62), which are distributed essentially uniformly about the axis of rotation (A) and pass through all contact blades (24, 25, 26, 27) in this example, are provided in the example shown. As an alternative, a different number and arrangement of radial mounting elements may be provided. One radial mounting element would basically suffice, and the contact blades (24, 25, 26, 27) can be supported centrally at the housing (60).

The above-described mounting and arrangement of the contact blades (24, 25, 26, 27), shown in FIGS. 6 through 9, with the plurality of contact surfaces (28, 29, 30, 31) has different advantages. Each lateral overhang of the contact blades, which carries a contact surface (28, 29, 30, 31), has to a certain extent an elastic mobility of its own, and each multiple arrangement of contact surfaces further has a shared mobility. The prestress, which is generated essentially via the spring elements (64, 66), may be distributed uniformly over the contact surfaces of the associated multiple arrangement. The rotary body (23) and especially the contact blades (24, 25, 26, 27) preferably have a shape that is rotationally symmetrical to the axis of rotation (A), and the contact tongues (51, 52, 53, 54) preferably have, furthermore, an essentially identical shape and are arranged rotationally symmetrically to the axis of rotation (A). A touching contact becomes established essentially simultaneously during a switching rotation in the area of a feed line terminal (20) as well as of a discharge line terminal (21).

Guide slopes, which facilitate in cooperation with the axial mobility of the pairs of contact blades, on the one hand, and with the prestress acting in the axial direction, on the other hand, an accurately fitting sliding on and a reliable and vibration-free contacting, are arranged at each of the contact surfaces (28, 29, 30, 31) and/or of the contact tongues (51, 52, 53, 54).

A total of four mutually redundant electrical contacts are formed in the example shown at each contact tongue (51, 52, 53, 54) to the contact surfaces at a pair of contact blades, and a defined prestressing force acts via each surface pair. As a result, the electrical contact resistance is minimized for each of these contact zones, so that heating of the contact zones is low even when the full main load is present. A contact grease, which facilitates the relative mobility and the electrical contacting even over long time periods, may possibly be applied to the contact tongues (51, 52, 53, 54) as well as to the contact surfaces (28, 29, 30, 31). Further, the contact surfaces and contact tongues are preferably provided with a plating consisting of a highly conductive material, which is applied by soldering or in another suitable manner, especially with a silver plating applied by soldering.

The housing (60) of the rotary body (23) is shown in FIGS. 6 through 9 in a preferred embodiment variant. It is configured as a multipart insulating housing and comprises a first half shell (73), a second half shell (74) and an inner sleeve (72). The at least one contact blade (24, 25, 26, 27) has a central ring section, from which the contact surfaces (28, 29, 30, 31) projecting in the radial direction extend towards two opposite sides. A central recess, through which the insulating housing (60) preferably extends, is located in the ring section. The contact blades preferably consist of a highly conductive metal, especially copper, and are made in one piece.

The contact blades may be spaced apart in relation to the housing (60) and especially the inner sleeve. It is thus achieved that a current (main load current or residual current) flowing via the contact blades (24, 25, 26, 27) cannot flow over to a shaft (11), which is arranged in the center of the rotary switch body (23). Especially inwards directed cylinder sections, which pass inwards through the central recesses in the contact blades (24, 25, 26, 27), may be provided at the half shells (73, 74). Furthermore, an additional, essentially cylindrical ring-shaped sleeve (72), which covers a gap between the half shells (73, 74), may be placed on these cylinder sections. The mounting and the shape of the contact blades (24, 25, 26, 27) may be selected to be such that an air gap remains between the central recess and the cylindrical sleeve or the inwards directed cylinder sections of the half shells (73, 74).

The half shells (73, 74) may, furthermore, cover the axial outer sides and in some areas the radial outer sides of the contact blades (24, 25, 26, 27), especially in the areas where no outwards projecting contact surfaces (28, 29, 30, 31) are located. In other words, the housing (60) preferably envelops all contact blades (24, 25, 26, 27) of the rotary switch body (23) in an insulating manner, with the exception of the contact surfaces (28, 29, 30, 31) projecting in the radial direction.

A gap between the half shells (73, 74) may also be covered on the radial outer side of the housing (60) by an additional insulating element (not shown).

The aforementioned features of the housing configuration produce especially long creep distances, which are consequently secured against disruptive breakdown. The configuration of the housing consequently guarantees a reliable insulation of the contact blades against the shaft and any rotary switch bodies arranged in an adjacent location.

The housing (60) of the rotary switch bodies (23) preferably comprises a (centrally symmetrically arranged) shaft mount. The housing (60) can be connected via this shaft mount to a shaft (11) of the residual load disconnector switch (1) such that they rotate in unison. A displaceability may possibly be provided in the axial direction. A torque is conducted preferably for carrying out a switching rotation from an external actuating element, especially generated by the jump drive (40), via the shaft (11) to the housing (60) of the rotary switch body (23) and farther via the at least one radial mounting element (62) to the contact blades (24, 25, 26, 27). The one or more axial mounting elements (61) are not preferably involved in the torque conduction.

The residual load disconnector switch according to the present disclosure may preferably have two or more rotary switch bodies (23), which are arranged next to one another especially in the axial direction (A). For example, two or more rotary switch bodies (23) may be arranged next to one another in the insulator chamber (14) in the embodiment according to FIGS. 1 through 4. Each of the rotary switch bodies may have according to the above explanation two pairs of contact blades or any other desired number of contact blades, especially one pair or three pairs.

Figure 12:
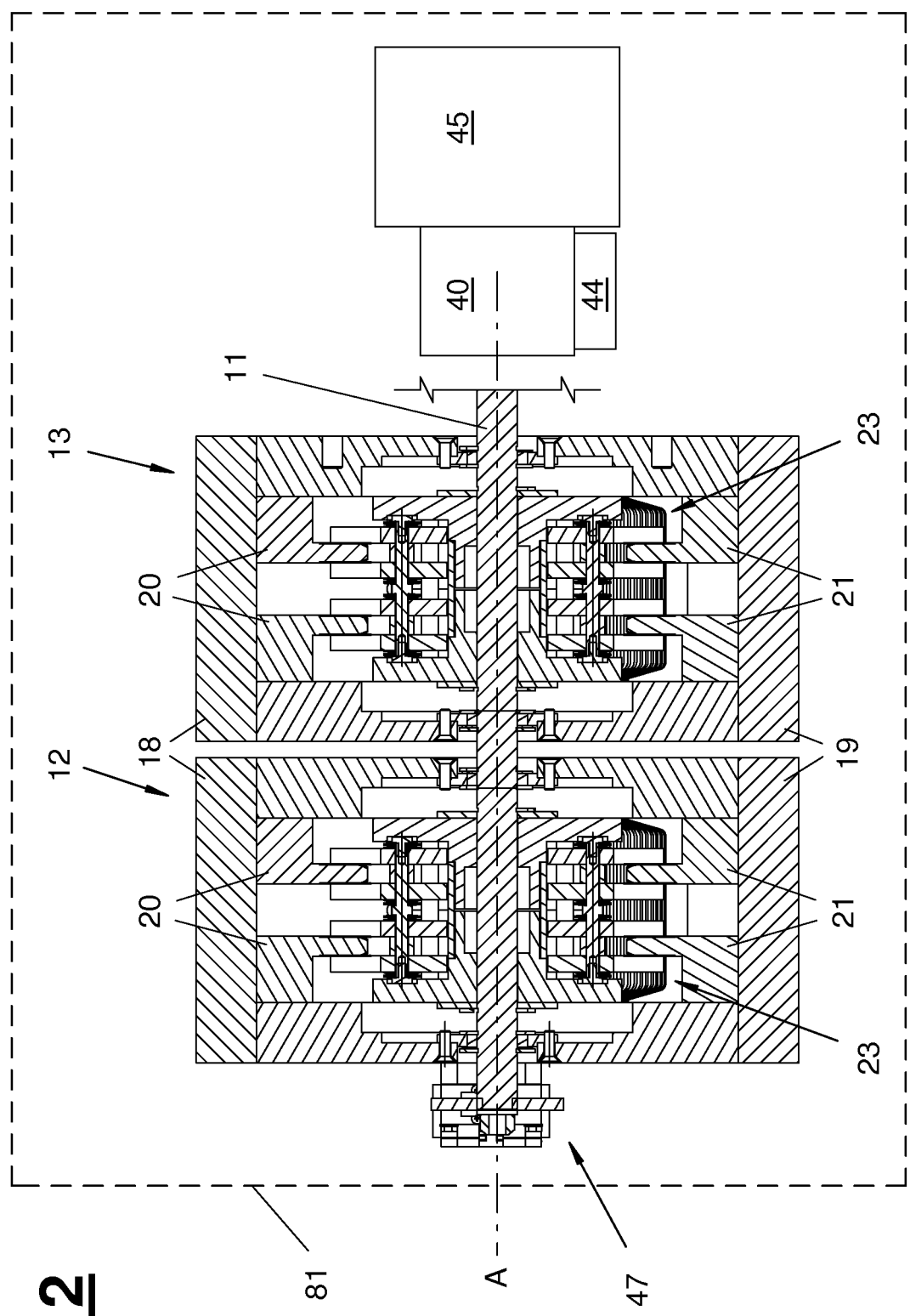
FIG. 12 is a horizontal half sectional view through the residual load disconnector switch from FIGS. 10 and 11.

Another and especially preferred embodiment for a multiple arrangement is shown in FIGS. 10 through 12. The residual load disconnector switch (1) comprises here two (or more) module switching blocks (12, 13). These comprise, in turn, an insulator chamber (14) of their own each with at least one feed line terminal (20), with a rotary switch body (23) and with at least one discharge line terminal (21). In other words, each of the module switching blocks (12, 13) is a switching device (22) according to the present disclosure. The plurality of module switching blocks (12, 13) is or can be connected to a common central shaft (11) (cf. FIG. 12) or to a plurality of coupled shafts (not shown).

The plurality of module switching blocks (12, 13) is preferably connected to a common jump drive (40), which is connected especially at a first end of the central shaft (11) or of a first of the coupled shafts. The position detection device (47), which can thus detect the common rotary position of all switching bodies (23) via the rotary position of the central shaft (11) or via the common rotary position of all switching bodies (23), is preferably arranged at the other end of the central shaft (11) or at the last of the coupled shafts.

As an alternative, a separate jump drive (40) and/or a separate position detection device (47) may be provided for one, two or more module switching blocks (12, 13).

The residual load disconnector switch (1) preferably has a feed-out collector (19), which is connected to all discharge line terminals (21) of the one or more module switching blocks (12, 13) or of one or more switching devices (22). This feed-out collector (19) can thus collect the main load current or the residual load current as a one-piece component and transmit it to a terminal (80) to a propulsion current supply conductor (8). The feed-out collector (19) may act, furthermore, as a cooling body in relation to the one or more discharge line terminals (21). All feed line terminals (20) of the one or more module switching blocks (12, 13) are likewise preferably connected to a common feeding rail (18), which may likewise bring about a cooling effect.

The feed-out collector (19) may act, furthermore, as a mechanical fastening device in order to fix the residual current disconnector switch (1) to an external structure and to support it with respect to forces. In particular, it may act as a common mechanical fastening for a plurality of module switching blocks (12, 13).

In other words, the residual load disconnector switch (1) is or can preferably be fastened to an external support structure (8) via the feed-out collector (19). Especially according to the view in FIG. 1, it can be fastened by means of the terminal (80) directly to a conductor rail (8) or directly to an overhead line (not shown) and supported mechanically in relation to this.

Thus, the residual load disconnector switch (1) according to the present disclosure can be arranged in the immediate vicinity of the propulsion current supply conductor (8) to be supplied, which makes it easy to find it, on the one hand, and makes its function obvious, on the other hand. As a consequence of the above-described redundant contact zones and the very compact configuration, which is made possible hereby, the residual load disconnector switch (1) may be arranged essentially without hindering the operation of the transport means (7) in space directly at a line section (6). It is not necessary to provide a separate switch cabinet at the feed point (9) or to arrange the residual load disconnector switch physically at a distance from the propulsion current supply conductor (8). The aforementioned aspects make it easier even for workers who are not familiar with the surroundings to be able to readily find the residual load disconnector switch in an emergency situation and to actuate it correctly. In particular, the association is simplified in case of arrangement of a plurality of residual load disconnector switches (1) for different propulsion current supply conductors (8) (for example, in a railroad station), so that the accidental breaking of the electrical connection to an incorrect line section is effectively avoided.

Figure 13:
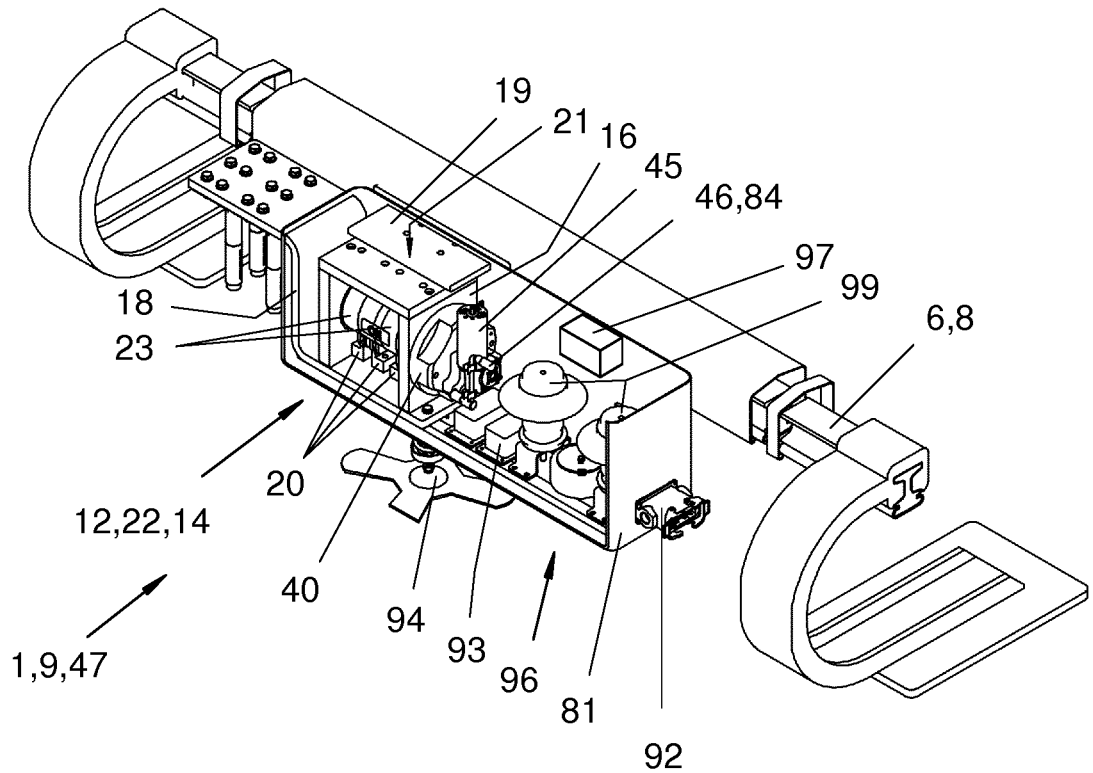
FIG. 13 is a perspective view showing another embodiment of a residual load disconnector switch with a modified housing and with a weight-compensating bracket.
Figure 14:
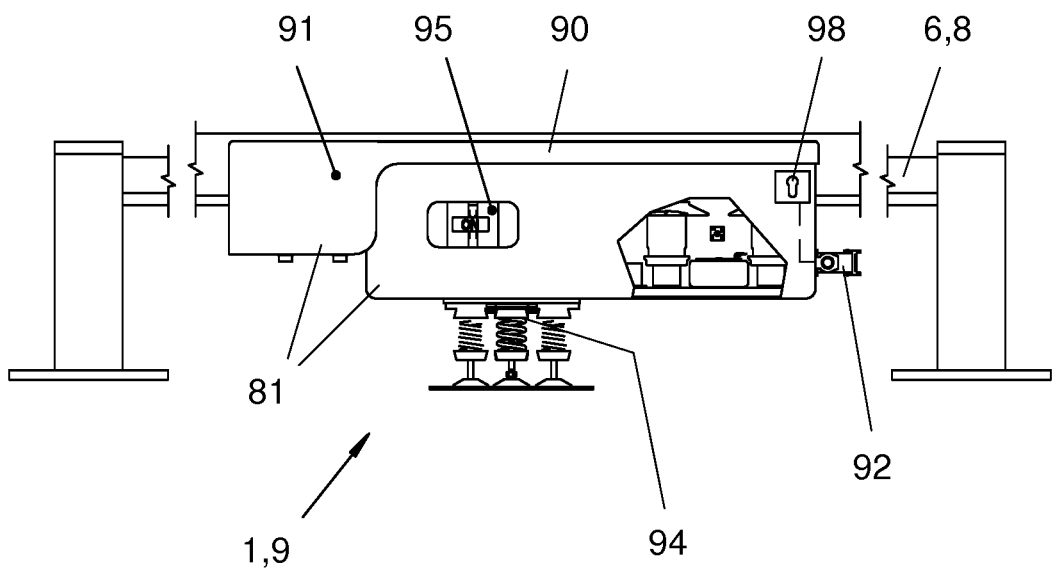
FIG. 14 is a side view showing the other embodiment of a residual load disconnector switch with the modified housing and with the weight-compensating bracket.

The residual load disconnector switch (1) may be accommodated in a protective housing (81) of its own, which is shown schematically in outlines in FIGS. 4 and 12. FIGS. 13 and 14 show another preferred embodiment of the protective housing.

The protective housing (81) may be a possibly removable component of the residual load disconnector switch (1) and may preferably be provided additionally to the insulation chamber (14), for example, in order to encapsulate the residual load disconnector switch (1) against the entry of dust or moisture. The protective housing (81) may be formed especially by a protective container (cf. FIG. 13). The protective housing (81) preferably meets protection class IP65.

Provisions are made in an especially preferred embodiment for the protective housing (81) to be mechanically supported directly or indirectly via the feed-out collector (19), namely, via the same external support structure to which the residual load disconnector switch (1) can be fixed.

In the example according to FIG. 4, the protective housing (81) is connected on its underside in a mechanically supporting manner to a lower cover (17) of the residual load disconnector switch (1), which cover is connected, in turn, to the feed-out collector (19) in a mechanically load-carrying manner. A force acting on the protective housing (81) from the outside is thus transmitted via the insulator chamber (14) to the feed-out collector (19) and from there to the terminal (80).

According to an embodiment shown in FIGS. 13 and 14, the residual load disconnector switch (1) may have a weight counterbalancing bracket (94). This may be formed especially in the form of a support foot or a support arm. An unacceptable deformation of the propulsion current supply conductor (8), to which the residual load disconnector switch (1) is fastened, may possibly arise from the weight of the residual load disconnector switch (1). On the other hand, additional deformations of the supply conductor (8) are possible due to temperature changes and possibly mechanical effects arising from the operation of the transport means.

The weight counterbalancing bracket (94) is preferably configured to allow an elastic deformation and a limited mobility or a limited joint motion of the residual current disconnector switch (1) and/or of the protective housing or of the protective container (81). The weight counterbalancing bracket (94) preferably comprises an elastic support device, for example, in the form of a spring. The support device can be prestressed. It can be prestressed to the extent that the weight of the residual load disconnector switch (1) and/or of the protective container (81) is predominantly completely compensated by the restoring force of the support device. The support device may, furthermore, be able to yield elastically in order to allow the raising or lowering of the residual load disconnector switch (1) and/or of the protective container (81) as a consequence of the effect of external forces. On the other hand, the support device preferably has an at least monoaxial, preferably biaxial transverse mobility, so that a horizontal evading motion of the residual load disconnector switch (1) and/or of the protective container (81) is made possible as well.

The feed-out collector (19) passes through the protective housing or the protective container (81) preferably while forming a sealing point, which is sealed especially against the entry of dust and water jets (cf. FIG. 4). The feed-out collector (19) especially preferably has a sealing seat (82) extending essentially in a ring-shaped manner and is connected to the protective housing (81) via a circumferential sealant (83). The entry of dust and water or moisture can be effectively avoided in this manner. In particular, no seams are produced in the area of the sealing seat (82) in case of the use of a one-piece feed-out collector (19), which is advantageous for a permanent sealing.

The protective housing (81) may preferably be able to be swung open, for example, according to the plane of division (88) shown in FIG. 4, which extends essentially obliquely to the horizontal plane. An upper part of the protective housing (81) can be swung away by means of a hinge (89) shown as an example in order to make a manual access possible to the manual drive (46) and to grips (85) arranged at the top at the residual load disconnector switch (1). The residual load disconnector switch (1) can thus be gripped directly in the opened state in order to position and to fix it, for example, with a preassembled terminal (80) at a propulsion current supply conductor (8).

The residual load disconnector switch (1) can thus be mounted together with the protective housing (81), and only the fixation points on the terminal (80) are to be fastened to the propulsion current supply conductor (8) as well as possibly at the feeding rail (18) to a feed line (4). The mounting and/or the replacement can thus be carried out especially rapidly and simply. It is further ensured as a consequence of the fixed combination of the residual load disconnector switch (1) and the protective housing (81) that the liquid- and dust-proof connection according to the specified protection class is met after the mounting. The sealing point between the sealant (83) and the sealing seat

(82) does not have to be touched for the mounting or removal of the residual load disconnector switch (1).

The feed-out collector (19) is preferably manufactured from a light alloy, especially aluminum. It preferably has a coating with high electrical conductivity, especially a silver coating or a silver plating. The coating may be applied on all sides.

The above-mentioned selection of material leads to different advantages. On the one hand, the total weight of the residual load disconnector switch (1) is reduced, so that it can be handled and mounted by only one worker. On the other hand, aluminum dissipates the heat possibly generated at the contact points in the interior of the residual load disconnector switch (1) especially well to the outside, so that the heat can be removed especially via the terminal (80) into the propulsion current supply conductor (8). An especially high conductivity, which is also preserved under unfavorable environmental conditions, is reached due to the silver plating.

The residual load disconnector switch (1) may preferably have an access limitation device, which allows manual access to the residual load disconnector switch (1) only when a detected electrical load, especially the defected load between the feed line terminal (20) and the discharge line terminal (21), drops below a permissibility limit value and/or when it is detected that an upstream main load disconnector switch (3) is opened. The access limitation device may be, for example, a lock mechanism or a locking mechanism, especially a controllable lock (98). It may interact with the above-described load detection device and/or with the above-described triggering device (44). It is preferably achieved by means of the access limitation device that manual access to the residual load disconnector switch (1) is only possible when no main load is present at the feed pint (9) or over the residual load disconnector switch (1), but only the defined residual load, preferably only an instantaneous load, which is lower than a low-voltage limit value, is present at best.

The residual load disconnector switch may have a remote control interface, which makes preferably possible a remote-controlled activation of the drive motor (45) and/or of the triggering device (44). The remote control interface may have any desired configuration.

As an alternative or in addition, the residual load disconnector switch (1) preferably has a remote monitoring interface, which is configured especially to transmit a switching state or a rotary position of the residual load disconnector switch (1) or of the rotary switch contact (23).

According to a preferred embodiment variant, the load detection device and/or the triggering device (44) and/or the access limitation device and/or the remote control interface and/or the remote monitoring interface may be integrated in a common control device, especially in a data processing device (97). The control device preferably has a separate power supply, especially a rechargeable battery or a battery. It may additionally be operated via the feed line (4) or the main load energy supply. The control device and/or one of the devices contained may have a communication interface (92, 97) for wired or wireless communication, for example, a network connection or a data modem.

FIGS. 13 and 14 show another preferred embodiment of a residual load disconnector switch (1), which has a protective housing in the form of a protective container (81). The residual load disconnector switch comprises, in the form shown, exactly one module switching block (12), at or in which an insulator chamber (14) and two rotary switch bodies (23) are arranged. The rotary switch bodies are arranged next to one another on a common shaft, which is also connected to the jump drive (40). The configuration otherwise corresponds to the variant explained above and shown in FIGS. 10 through 12. The module switching block (12) is tilted about the longitudinal axis (A) compared to FIGS. 10 through 12, so that the feed line terminals (20) are arranged in the horizontal direction under the rotary switch bodies (23) and the discharge line terminals (21) are arranged in the horizontal direction above the rotary switch bodies (23). As an alternative, an arrangement turned about the horizontal axis is possible.

The residual load disconnector switch (1) according to FIGS. 13 and 14 comprises an essentially two-part protective container (81). The lower part of the protective container (81) has a trough-like configuration. The module switching block (12), the jump drive (40) as well as additional control and detection devices are accommodated in the lower part. The control and detection devices comprise at least one of the following components and preferably a plurality of the following components:

A position detection device (47);
a load detection, here comprising an over- and undervoltage relay (92);
an electric motor (45);
a transformer or another suitable power supply for the electric motor (45);
a data processing device (97); and
a wireless communication interface.

One or more windows (95) may be provided in the lower part, especially in the area of the front wall, in order to make possible a view to the switching device (22) and especially to the rotary switch body or rotary switch bodies (23). An instantaneous switching position of the rotary switch bodies can be determined visually through the window (95). The switching position can preferably be detected additionally through the position detection device (47), which is located behind the switching device (22) in the view shown in FIG. 13.

The data processing device (97) may have any desired configuration. It may be configured especially as a universal computer or as a programmable control device. The data processing device (97) especially preferably comprises a wireless communication interface, which exchanges messages with external communication partners, for example, via WLAN, UMTS, GPS, LTE or another wireless communication standard.

The upper part of the protective container (81) is configured as a cover (90). According to the above explanations, it may be able to be swung open. The cover may be able to be locked in the closed state, especially by a controllable lock (98) according to the above explanations.

An overhang, which projects over the lower part of the protective container (81) and forms a terminal cover (91) for the feeding rails (18) and connectors fastened there for a feed line (4), may be made in one piece on at least one side of the cover (90). The feeding rail (18) is led laterally out of the lower part of the protective container (81) in the example shown in FIGS. 13 and 14. The passage is preferably provided with a seal in order to prevent moisture or water from entering into the protective container (81).

A wired communication interface (92) may be provided at the protective container (81), especially on the side wall thereof. The wired communication interface may be present as an alternative or in addition to a wireless communication interface. The wireless communication interface is combined with an interface for feeding a general power in the example according to FIGS. 13 and 14. The general power may be fed in order to operate the electric motor (45) and possibly one or more of the above-mentioned control and detection devices. As an alternative or in addition, one or more of the above-mentioned control and detection devices may be operated by a current that is sent over the feed line (4).

The residual load disconnector switch (1) may comprise an energy storage device (battery), which supplies one or more of the above-mentioned control and detection devices with power in case of failure of the general power supply and/or of the propulsion current supply over a bridge-over time. The residual load disconnector switch (1) may correspondingly have one or more charging devices or another suitable charging device in order to charge the energy storage device from the propulsion current or the general power.

The storage capacity of the energy storage device is preferably selected to be such that the energy storage device preferably supports at least six or 10 switching operations of the residual load disconnector switch as well as a remote monitoring and/or remote control operation for at least 24 hours, preferably at least 72 hours or at least 5 days in case of a full charge.

A software product, which comprises instructions for carrying out an operating method according to the present disclosure, may be installed or executed on the data processing device (97). The software product may be present on a physical data storage medium. The software product may also be present or stored outside the data processing device, especially on an external server, from which it can be transferred to the data processing device from time to time or permanently.

A preferred embodiment of the residual current disconnector switch (1) makes provisions for access to the residual current disconnector switch (1) and especially to the control and detection devices thereof to be made possible only after a successful authentication. The residual load disconnector switch may have any desired authentication checking device for this purpose, which may be configured especially in the form of a software component and/or in the form of a hardware component. For example, an authentication request can be received via one of the communication interfaces (92, 97) for access to the residual current disconnector switch (1). This request may be sent from a remote control center or from a carried-along mobile device of a worker. When the authentication request is confirmed by the authentication checking device, a remote monitoring access and/or a remote control access and/or a manual access can be released.

In case of a remote monitoring release, one or more status messages on the residual load disconnector switch (1) and/or the control and detection devices thereof can be transmitted, including especially a determined switching position of the at least one rotary switch body (23), an instantaneously present load and/or a load state of the jump drive and/or of the energy storage device. Furthermore, one or more alarm states may be transmitted, especially on whether it was determined that a rotary switch body (23) is in an intermediate position.

In case of a remote control release, a request for breaking (or establishing) the electrical connection can be processed at the residual load disconnector switch (1) according to the operating method explained.

When a release is given for the manual access, the controllable lock (98) can be actuated in order to make it possible to open the protective container (81). The controllable lock (98) may additionally require the feeding or insertion of a physical unblocking device, especially a key, in order to open the cover (90).

If the authentication checking device partially or completely rejects an authentication request, one or more of the aforementioned releases may be correspondingly refused, so that a request for breaking (or establishing) the electrical connection correspondingly remains ignored at the residual load disconnector switch (1), and/or no status messages are sent about the residual load disconnector switch (1) and a manual access to the residual load disconnector switch (1) and especially opening of the protective container (81) are prevented.

The residual load disconnector switch (1) may furthermore generate and send a warning message if it is determined despite a rejected request for authentication that the protective housing (81) is opened and/or that the switching state of the residual load disconnector switch (1) changes.

The residual load disconnector switch (1) may have an overvoltage protection (99), which is arranged especially within the protective housing (81) as a single unit or as multiple units. The overvoltage protection (99) is preferably arranged in an electrical connection between the feed line (4) and the feed line terminal (20) of the residual load disconnector switch (1).

The receipt and the sending of data messages may take place in any suitable manner with the use of a wired and/or wireless communication interface (92, 97). The data messages may comprise especially a request for breaking or establishing the electrical connection, a confirmation of breaking or confirmation of switching on, one or more status messages as well as authentication requests and authentication confirmations.

According to a preferred embodiment, signals can be modulated for sending or receiving data messages to a load current line, which is connected to the residual load disconnector switch. The load current line may be especially the feed line (4) for the propulsion current or a line for the general power. It can be achieved due to the modulation of a signal for exchanging data messages, in particular, that no additional communication lines need to be installed.

When the residual load disconnector switch is used to operate an overhead line, it may be especially advantageous to use a wireless communication interface.

Various modifications of the disclosed invention are possible; in particular, the features shown or described in connection with the different embodiment variants may be combined or replaced with one another.

The residual load disconnector switch (1) according to the embodiment shown in FIGS. 1 through 4 may be configured to carry a main load of up to 4,000 A and/or for breaking a residual load of up to 900 A. The residual load disconnector switch (1) according to the embodiment shown in FIGS. 10 through 12 may be configured to carry a main load of up to 8,000 A and/or to break a residual load of up to 1,800 A. The maximum allowable limit values for the main load and the residual load can be changed correspondingly by adding additional rotary switching bodies (23) and/or module switching blocks (12, 13).

The rotary switch body (23) with the housing configuration (60) according to FIGS. 6 through 9 may also be equipped with a smaller number of contact blades (24, 25, 26, 27), especially with only one pair of contact blades.

The interaction and the mounting concept for the contact tongues and the contact blades may be inverted, so that a first contact tongue and a second contact tongue are provided at one contact blade, while a pair of prestressed contact bodies, which carry the contact surfaces, especially a multiple arrangement of contact surfaces, is provided at a feed line terminal (20) and/or at a discharge line terminal (21). The contact bodies may have in this case an internal mobility in the axial direction, while the axial position of the contact blades may be fixed.

While specific embodiments of the invention have been shown and described in detail to illustrate the application of the principles of the invention, it will be understood that the invention may be embodied otherwise without departing from such principles.

The invention claimed is:

1. A residual load disconnector switch for breaking an electrical connection to a propulsion current supply conductor for a transport device, the residual load disconnector switch comprising:
   a feed line terminal;
   a discharge line terminal; and
   a switching device, the switching device comprising a rotary switch body comprising a contact blade rotatable about an axis arranged between the feed line terminal and the discharge line terminal, the contact blade comprising contact surfaces projecting radially on a contact blade end side, wherein:
   the contact surfaces are in touching contact with both the feed line terminal and the discharge line terminal in a closed rotary position of the rotary switch body;
   the contact surfaces are located at a spaced location from the feed line terminal and the discharge line terminal in an open rotary position of the rotary switch body;
   the residual load disconnector switch performs switching motions of the rotary switch body that are rotationally limited in one rotational direction; and
   the switching motions are actuated unidirectionally and cyclically to move the rotary switch body from the closed rotary position into the open rotary position and again into the closed rotary position;
   a jump drive configured to drive the rotary switch body to rotation, the jump drive comprising a triggering device configured to trigger the rotation, the jump drive comprising an energy storage device, and the triggering device being configured to prevent the rotation when the energy storage device has an insufficient charge or prestress.

2. The residual load disconnector switch in accordance with claim 1, wherein the jump drive is configured to drive the rotary switch body to an abrupt switching rotation, wherein a complete rotary motion between the closed rotary position and the open rotary position takes place in less than 200 msec.

3. The residual load disconnector switch in accordance with claim 1, further comprising a load detector configured to monitor a current flow and/or a voltage between the feed line terminal and the discharge line terminal, wherein the triggering device is configured to prevent a switching motion of the rotary switch body when a detected electrical load between the feed line terminal and the discharge line terminal exceeds a limit value.

4. The residual load disconnector switch in accordance with claim 1, further comprising a position detection device configured to detect a rotary position of the rotary switch body or configured to detect a presence of the closed rotary position or an open rotary position of the rotary switch body.

5. The residual load disconnector switch in accordance with claim 1, wherein:
   the rotary switch body further comprises another contact blade, the contact blade and the other contact blade providing a pair of contact blades;
   the feed line terminal and the discharge line terminal each have a contact tongue in touching contact with the pair of contact blades in the closed rotary position; and
   the contact surfaces of at least one contact blade of the pair of contact blades comprises a first multiple arrangement of contact surfaces for touching the contact tongue at the feed line terminal and another multiple arrangement of contact surfaces for touching the contact tongue at the discharge line terminal.

6. The residual load disconnector switch in accordance with claim 1, wherein:
   the rotary switch body further comprises an insulating housing comprising a first half shell, a second half shell and an inner sleeve; and
   the contact blade has a central recess, through which the housing extends;
   the housing comprises a shaft mount connected to a shaft for rotation in unison.

7. The residual load disconnector switch in accordance with claim 1, further comprising another rotary switch body to provide a plurality of rotary switch bodies arranged next to each other in an axial direction.

8. The residual load disconnector switch in accordance with claim 7, further comprising:
   a first switching block comprising an insulator chamber and said feed line terminal, said rotary switch body and said discharge line terminal; and
   a second switching block comprising an insulator chamber and a feed line terminal, said another rotary switch body and a discharge line terminal.

9. The residual load disconnector switch in accordance with claim 1, further comprising a feed-out collector wherein the residual load disconnector switch is configured to be fastened to an external support structure via the feed-out collector.

10. The residual load disconnector switch in accordance with claim 9, in combination with a protective housing, wherein the residual load disconnector switch is received in the protective housing and the protective housing supported especially directly or indirectly via the feed-out collector.

11. The residual load disconnector switch in accordance with claim 1, further comprising an access limitation device, which makes possible a manual access to the residual load disconnector switch only when a detected electrical load between the feed line terminal and the discharge line terminal falls below a permissibility limit value.

12. The residual load disconnector switch in accordance with claim 1, further comprising a remote control interface.

13. The residual load disconnector switch in accordance with claim 12, further comprising:
   a drive motor; and
   a triggering device configured to trigger switching rotation, wherein the remote control interface is configured to provide a remote-controlled activation of the drive motor and/or the triggering device.

14. The residual load disconnector switch in accordance with claim 1, further comprising a remote monitoring interface configured to transmit a switching state of the residual load disconnector switch.

15. A rotary switch body for a residual load disconnector switch comprising a feed line terminal, a discharge line terminal, and a switching device, the switching device comprising a rotary switch body comprising a contact blade rotatable about an axis arranged between the feed line terminal and the discharge line terminal, the contact blade comprising contact surfaces projecting radially on a contact blade end side, wherein the contact surfaces are in touching contact with both the feed line terminal and the discharge line terminal in a closed rotary position of the rotary switch body, the contact surfaces are located at a spaced location from the feed line terminal and the discharge line terminal in an open rotary position of the rotary switch body, the residual load disconnector switch performs switching motions of the rotary switch body that are rotationally limited in one rotational direction; and the switching motions are actuated unidirectionally and cyclically to move the rotary switch body from the closed rotary position into an open rotary position and again into the closed rotary position, the rotary switch body comprising a multipart insulating housing comprising:
- a first half shell;
- a second half shell; and
- an inner sleeve, wherein the contact blade has a central recess, through which the housing extends.

16. The rotary switch body in accordance with claim 15, wherein:
- the residual load disconnector switch further comprises a shaft; and
- the housing of the rotary switch body comprises a shaft mount, via which the housing is connected to the shaft of the residual load disconnector switch for rotation in unison.

17. The rotary switch body in accordance with claim 15 in combination with a module switching block for the residual load disconnector switch, the module switching block comprising an insulator chamber with the feed line terminal, and with the rotary switch body and with the discharge line terminal.

18. A residual load disconnector switch operating method comprising:
- providing a residual load disconnector switch for breaking an electrical connection to a propulsion current supply conductor for a transport device, wherein the residual load disconnector switch comprising a feed line terminal and a discharge line terminal;
- providing a rotatory jump drive configured to drive the rotary switch body to an abrupt switching rotation;
- providing the residual load disconnector switch with a load detector monitoring a current flow and/or a voltage between the feed line terminal and a discharge line terminal of the residual load disconnector switch;
- receiving a request for breaking the electrical connection at the residual load disconnector switch;
- checking a load that is present at the residual load disconnector switch between the feed line terminal and the discharge line terminal; and
- triggering the abrupt rotary motion of the rotary switch body upon determining that the load is lower than a permissible residual load, wherein:
the residual load disconnector switch further comprises a switching device, the switching device comprising a rotary switch body comprising a contact blade rotatable about an axis arranged between the feed line terminal and the discharge line terminal, the contact blade comprising contact surfaces projecting radially on a contact blade end side, wherein the contact surfaces are in touching contact with both the feed line terminal and the discharge line terminal in a closed rotary position of the rotary switch body, the contact surfaces are located at a spaced location from the feed line terminal and the discharge line terminal in an open rotary position of the rotary switch body, the residual load disconnector switch performs switching motions of the rotary switch body that are rotationally limited in one rotational direction; and the switching motions are actuated unidirectionally and cyclically to move the rotary switch body from the closed rotary position into an open rotary position and again into the closed rotary position; and/or the residual load disconnector switch is provided in combination with a rotary switch body comprising a multipart insulating housing comprising a first half shell, a second half shell; and an inner sleeve, wherein the contact blade has a central recess, through which the housing extends; and/or a module switching block is provided for the residual load disconnector switch, the module switching block comprising an insulator chamber with the feed line terminal, and with the rotary switch body and with the discharge line terminal.

19. The residual load disconnector switch operating method in accordance with claim 18, further comprising:
- providing a communication interface for wireless or wired communication; and
- receiving a request for breaking the electrical connection from an external signal transmitter.

20. The residual load disconnector switch operating method in accordance with claim 18, wherein
- the residual load disconnector switch has a motor to charge the jump drive or an energy storage device; and the motor is operated only when it is determined that a load that is present at the residual load disconnector switch between the feed line terminal and the discharge line terminal is lower than the permissible residual load; and/or
- the abrupt rotary motion is triggered, so that the rotary switch body is moved from the closed rotary position into the open rotary position only upon the energy storage device having reached a necessary charge, and/or
- the residual load disconnector switch has a position detection device configured to detect a rotary position of the at least one rotary switch body to detect the closed rotary position or the open rotary position wherein a rotary position of the rotary switch body and/or a presence of the closed rotary position or of an open rotary position is transmitted as a status message via the communication interface.

21. A residual load disconnector switch for breaking an electrical connection to a propulsion current supply conductor for a transport device, the residual load disconnector switch comprising:
- a feed line terminal;
- a discharge line terminal; and
- a switching device, the switching device comprising a rotary switch body comprising a contact blade rotatable about an axis arranged between the feed line terminal and the discharge line terminal, the contact blade comprising contact surfaces projecting radially on a contact blade end side, wherein:
the contact surfaces are in touching contact with both the feed line terminal and the discharge line terminal in a closed rotary position of the rotary switch body;
the contact surfaces are located at a spaced location from the feed line terminal and the discharge line terminal in an open rotary position of the rotary switch body;
the residual load disconnector switch performs switching motions of the rotary switch body that are rotationally limited in one rotational direction; and
the switching motions are actuated unidirectionally and cyclically to move the rotary switch body from the closed rotary position into the open rotary position and again into the closed rotary position;

the rotary switch body further comprising an insulating housing comprising a first half shell, a second half shell and an inner sleeve, and the contact blade has a central recess, through which the housing extends, the housing comprising a shaft mount connected to a shaft for rotation in unison.

22. A residual load disconnector switch for breaking an electrical connection to a propulsion current supply conductor for a transport device, the residual load disconnector switch comprising:

a feed line terminal;

a discharge line terminal; and a switching device, the switching device comprising a rotary switch body comprising a contact blade rotatable about an axis arranged between the feed line terminal and the discharge line terminal, the contact blade comprising contact surfaces projecting radially on a contact blade end side, wherein:

the contact surfaces are in touching contact with both the feed line terminal and the discharge line terminal in a closed rotary position of the rotary switch body;

the contact surfaces are located at a spaced location from the feed line terminal and the discharge line terminal in an open rotary position of the rotary switch body;

the residual load disconnector switch performs switching motions of the rotary switch body that are rotationally limited in one rotational direction;

the switching motions are actuated unidirectionally and cyclically to move the rotary switch body from the closed rotary position into an open rotary position and again into the closed rotary position; and a feed-out collector wherein the residual load disconnector switch is configured to be fastened to an external support structure via the feed-out collector.

23. A residual load disconnector switch for breaking an electrical connection to a propulsion current supply conductor for a transport device, the residual load disconnector switch comprising:

a feed line terminal;

a discharge line terminal; and a switching device, the switching device comprising a rotary switch body comprising a contact blade rotatable about an axis arranged between the feed line terminal and the discharge line terminal, the contact blade comprising contact surfaces projecting radially on a contact blade end side, wherein:

the contact surfaces are in touching contact with both the feed line terminal and the discharge line terminal in a closed rotary position of the rotary switch body;

the contact surfaces are located at a spaced location from the feed line terminal and the discharge line terminal in an open rotary position of the rotary switch body;

the residual load disconnector switch performs switching motions of the rotary switch body that are rotationally limited in one rotational direction;

the switching motions are actuated unidirectionally and cyclically to move the rotary switch body from the closed rotary position into an open rotary position and again into the closed rotary position; and an access limitation device, which makes possible a manual access to the residual load disconnector switch only when a detected electrical load between the feed line terminal and the discharge line terminal falls below a permissibility limit value.

* * * * *